US010331297B2

(12) United States Patent
Robbin et al.

(10) Patent No.: US 10,331,297 B2
(45) Date of Patent: Jun. 25, 2019

(54) DEVICE, METHOD, AND GRAPHICAL USER INTERFACE FOR NAVIGATING A CONTENT HIERARCHY

(71) Applicant: Apple Inc., Cupertino, CA (US)

(72) Inventors: Jeffrey L. Robbin, Los Altos, CA (US); Taylor G. Carrigan, San Francisco, CA (US); Brendon E. Manwaring, San Francisco, CA (US); Monika E. Gromek, Oakland, CA (US); William M. Bachman, San Jose, CA (US); Daniel Pu, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 400 days.

(21) Appl. No.: 14/501,988

(22) Filed: Sep. 30, 2014

(65) Prior Publication Data
US 2015/0346919 A1    Dec. 3, 2015

Related U.S. Application Data

(60) Provisional application No. 62/005,854, filed on May 30, 2014.

(51) Int. Cl.
*G06F 3/048* (2013.01)
*G06F 3/0482* (2013.01)
(Continued)

(52) U.S. Cl.
CPC ............ *G06F 3/0482* (2013.01); *G06F 3/048* (2013.01); *G06F 3/0485* (2013.01); *G06F 3/0488* (2013.01); *G06F 3/04842* (2013.01)

(58) Field of Classification Search
CPC ... G06F 3/048; G06F 17/30067; G06F 3/0482
See application file for complete search history.

(56) References Cited

U.S. PATENT DOCUMENTS 6,112,201 A * 8/2000 Wical ................ G06F 17/30572
6,341,280 B1 * 1/2002 Glass ................ G06F 17/30067
707/754

(Continued)

OTHER PUBLICATIONS

PCT International Search Report and Written Opinion for PCT/US2015/030142, dated Jul. 24, 2015, 10 Pages.

(Continued)

*Primary Examiner* — Li P Sun
*Assistant Examiner* — Qi Wan
(74) *Attorney, Agent, or Firm* — Fernando & Partners, LLP; Prateek Bhatnagar

(57) ABSTRACT

A first user interface is displayed on an electronic device. The first user interface is associated with a first internal node of a content hierarchy, and includes a context region, a header region comprising information identifying the first internal node, and a child-node region comprising one or more selectable identifiers that correspond to one or more child nodes of the first internal node. A selection of a respective child-node identifier is detected. In response, a transition to a second user interface associated with the respective child node is displayed. The transition comprises, while maintaining display of the one or more selectable labels in the context region, moving the respective child-node identifier upward toward the header region, and updating the context region by transforming the information identifying the first internal node into a selectable label identifying the first internal node as an ancestor node of the respective child node.

18 Claims, 30 Drawing Sheets

(51) Int. Cl.
*G06F 3/0484* (2013.01)
*G06F 3/0488* (2013.01)
*G06F 3/0485* (2013.01)

(56) References Cited

U.S. PATENT DOCUMENTS

| | | | | |
|---|---|---|---|---|
| 7,587,685 | B2* | 9/2009 | Wallace | G06T 11/206 |
| | | | | 715/851 |
| 8,271,898 | B1* | 9/2012 | Mattos | G06F 3/0485 |
| | | | | 345/473 |
| 2005/0114435 | A1* | 5/2005 | DiPlacido | H04L 69/329 |
| | | | | 709/202 |
| 2005/0182742 | A1* | 8/2005 | Griffin | G06F 17/30873 |
| 2006/0036568 | A1* | 2/2006 | Moore | G06F 17/30126 |
| 2008/0165150 | A1* | 7/2008 | Kwon | G06F 3/0488 |
| | | | | 345/173 |
| 2008/0216005 | A1* | 9/2008 | Bamba | G06F 3/0482 |
| | | | | 715/765 |
| 2011/0302532 | A1* | 12/2011 | Missig | G06F 3/0416 |
| | | | | 715/823 |
| 2012/0173977 | A1* | 7/2012 | Walker | G06F 3/0485 |
| | | | | 715/716 |
| 2013/0125060 | A1* | 5/2013 | Lee | G06F 3/048 |
| | | | | 715/853 |
| 2013/0125062 | A1 | 5/2013 | Lee et al. | |
| 2013/0127898 | A1* | 5/2013 | DiVerdi | G06T 11/203 |
| | | | | 345/600 |
| 2013/0198678 | A1* | 8/2013 | Lee | G06F 3/0488 |
| | | | | 715/776 |
| 2013/0275921 | A1 | 10/2013 | Lee et al. | |
| 2015/0186397 | A1* | 7/2015 | Cueto | G06F 17/30126 |
| | | | | 715/854 |
| 2015/0324074 | A1* | 11/2015 | Van Winkle | G06F 3/0483 |
| | | | | 715/776 |

OTHER PUBLICATIONS

Written Opinion of the International Preliminary Examining Authority for PCT/US2015/030142, dated May 11, 2016, 4 Pages.
PCT International Preliminary Report on Patentability for PCT/US2015/030142, dated Sep. 20, 2016, 7 Pages.

* cited by examiner

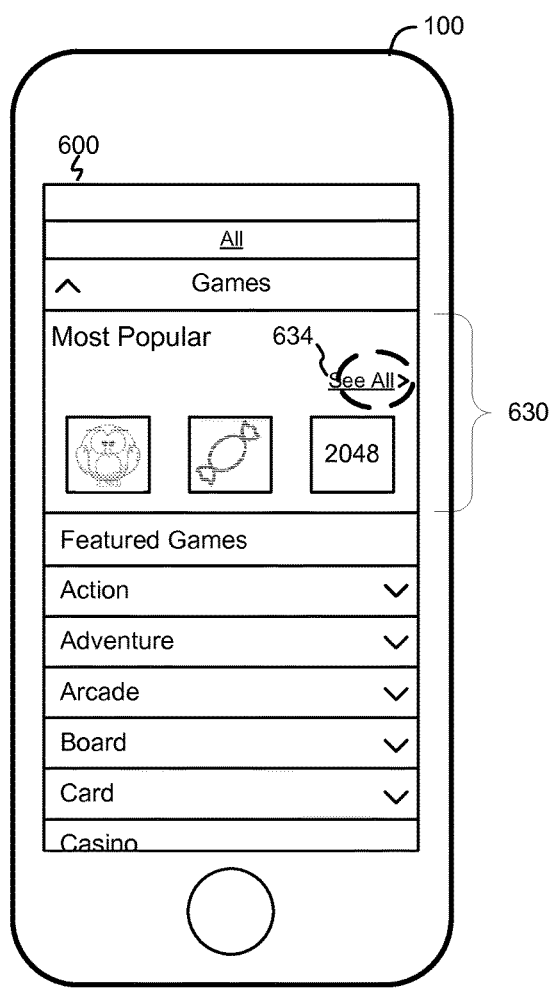
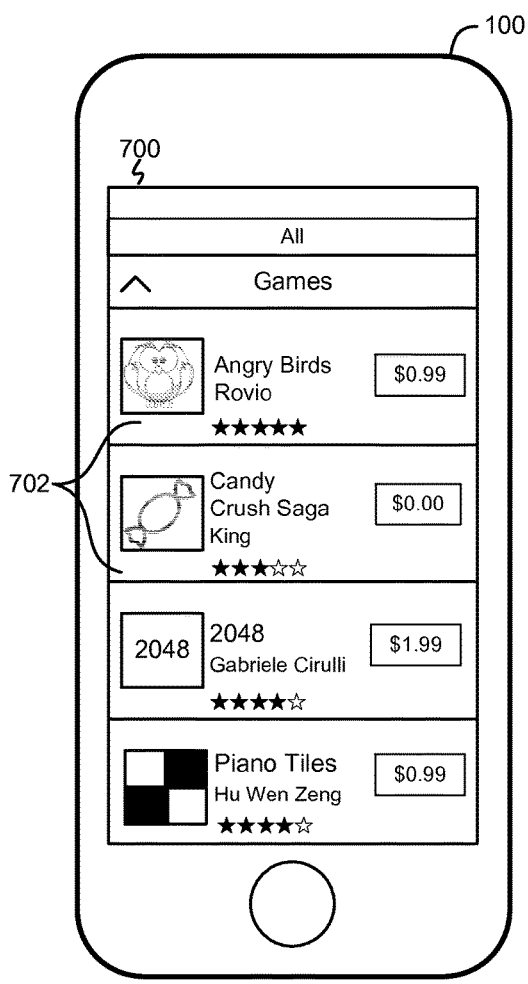
Figure 7A
Figure 7B

DEVICE, METHOD, AND GRAPHICAL USER INTERFACE FOR NAVIGATING A CONTENT HIERARCHY

CROSS-REFERENCE TO RELATED APPLICATION

This application claims the benefit of U.S. Provisional Application No. 62/005,854, filed May 30, 2014, which is incorporated herein by reference in its entirety.

TECHNICAL FIELD

This relates generally to user interfaces, and in particular to user interfaces for navigating hierarchically-organized content items.

BACKGROUND

Content hierarchies are commonly used to organize content. By organizing content items into hierarchical categories with defined relationships to one another, content hierarchies provide a logical structure for the content. One benefit provided by content hierarchies is enabling users to browse content in a logical manner. For example, a user can browse for content items of interest by navigating the hierarchy of categories.

However, if a content hierarchy contains many levels, users may easily lose context of the hierarchy as they browse. The users may forget which levels of the hierarchy they have traversed or may not maintain awareness of the relationship between the categories they are browsing.

SUMMARY

Accordingly, an improved user interface for navigating content hierarchies is needed. Devices, methods, and graphical user interfaces for navigating a content hierarchy improve a user's understanding of relationships between categories in the content hierarchy and the user's navigation through the content hierarchy. The graphical user interfaces provide for logical navigation of the content hierarchy and illustrate a relationship between content items and the rest of the hierarchy to provide users with context for the user interfaces.

In accordance with some embodiments, a method is performed by an electronic device for navigating a content hierarchy. The method comprises displaying a first user interface associated with a first internal node of a hierarchy, the first user interface including a content region comprising one or more selectable labels identifying one or more ancestor nodes of the first internal node, a header region comprising information identifying the first internal node, and a child-node region comprising one or more selectable identifiers that correspond to one or more child nodes of the first internal node. The method also includes detecting selection of a respective child-node identifier of the one or more child-node identifiers, wherein the respective child-node identifier corresponds to a respective child node. The method further includes, responsive to detecting selection of the respective child-node identifier, displaying a transition to a second user interface associated with the respective child node, the transition comprising, while maintaining display of the one or more selectable labels in the context region: moving the respective child-node identifier upward toward the header region, and updating the context region by transforming the information identifying the first internal node that was displayed in the header region into a selectable label identifying the first internal node as an ancestor node of the respective child node.

Thus, devices, user interfaces, and methods for navigating a content hierarchy as described herein provide users with information about the relationship of a node in the content hierarchy to the rest of the content hierarchy without overly cluttering the user interface.

The features and advantages described in this summary and the following detailed description are not all-inclusive. Many additional features and advantages will be apparent to one of ordinary skill in the art in view of the drawings, specification, and claims.

BRIEF DESCRIPTION OF THE DRAWINGS

FIG. 7A illustrates an exemplary user input at a user interface associated with an internal node of a category tree in accordance with some embodiments.

FIG. 7B illustrates an exemplary user interface with content item representations in accordance with some embodiments.

DETAILED DESCRIPTION

Figure 1A:
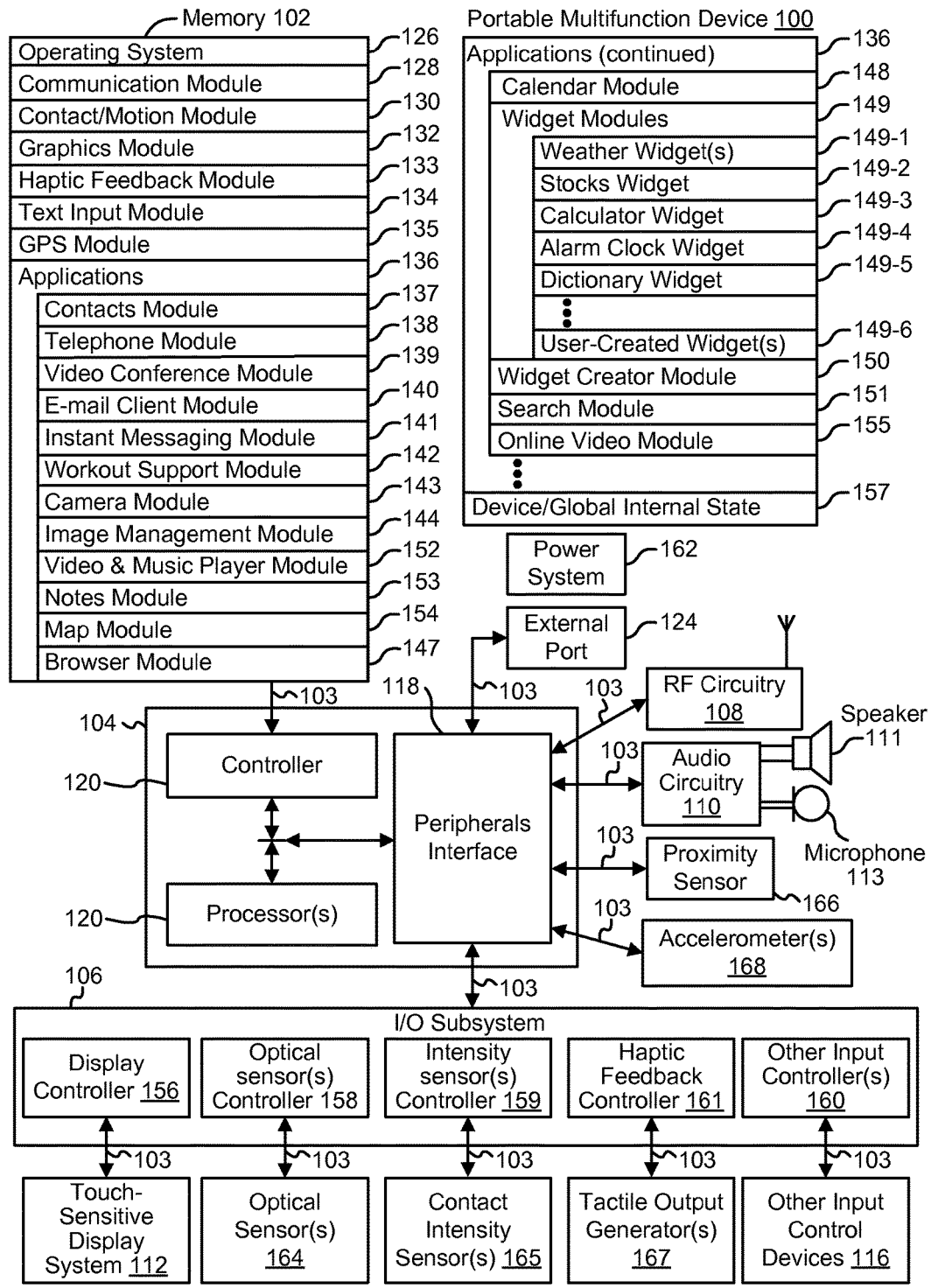
FIG. 1A is a block diagram illustrating a portable multifunction device with a touch-sensitive display in accordance with some embodiments.

Content hierarchies provide a logical structure for users to navigate content items. A content hierarchy organizes content into a category tree that represents a plurality of categories and organizes the categories into a hierarchy of categories. Each category is a node in the category tree. The categories may each represent any descriptor of content items, such as item types, topics, genres, languages, prices, brands, colors, or sizes. Each content item is associated with one or more of the categories in the category tree. Some category trees may contain many levels of categories, such that a user may lose context of the category tree if context is not provided to the user.

To provide a mechanism for users to navigate a content hierarchy, an electronic device displays various graphical user interfaces associated with the nodes in the category tree. In some embodiments, the user interfaces associated with the nodes in the category tree display context regions identifying ancestor nodes of the node associated with the user interface, illustrating the relationship of the node associated with the user interface to other nodes in the category tree. Furthermore, to accommodate space limitations on relatively small devices, the labels are arranged vertically in the user interfaces. Accordingly, graphical user interfaces according to various embodiments described herein provide users with information about the relationship of a node in the category tree to the rest of the category tree without overly cluttering the user interface.

Embodiments are described herein with respect to navigating applications in an application store. However, similar devices, methods, and user interfaces may be used to navigate other types of content items, such as music, books, videos, or podcasts. In some cases, the content items are available to be downloaded to a device used to browse the content items. For example, a mobile device may be used to browse applications available to be downloaded to the mobile device. In other cases, the content items, including electronic and physical content items, are available to be purchased. For example, a device is used to browse products for sale, which can be ordered via the device and delivered to the user.

Exemplary Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer with a touch-sensitive surface (e.g., a touch screen display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch sensitive surface, or to a substitute (proxy) for the force or pressure of a contact on the touch sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU 120 and the peripherals interface 118, is, optionally, controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device, so that the touch screen display is enabled for use as a viewfinder for still and/or video image acquisition. In some embodiments, another optical sensor is located on the front of the device so that the user's image is, optionally, obtained for videoconferencing while the user views the other video conference participants on the touch screen display.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is coupled to input controller 160 in 1/0 subsystem 106. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
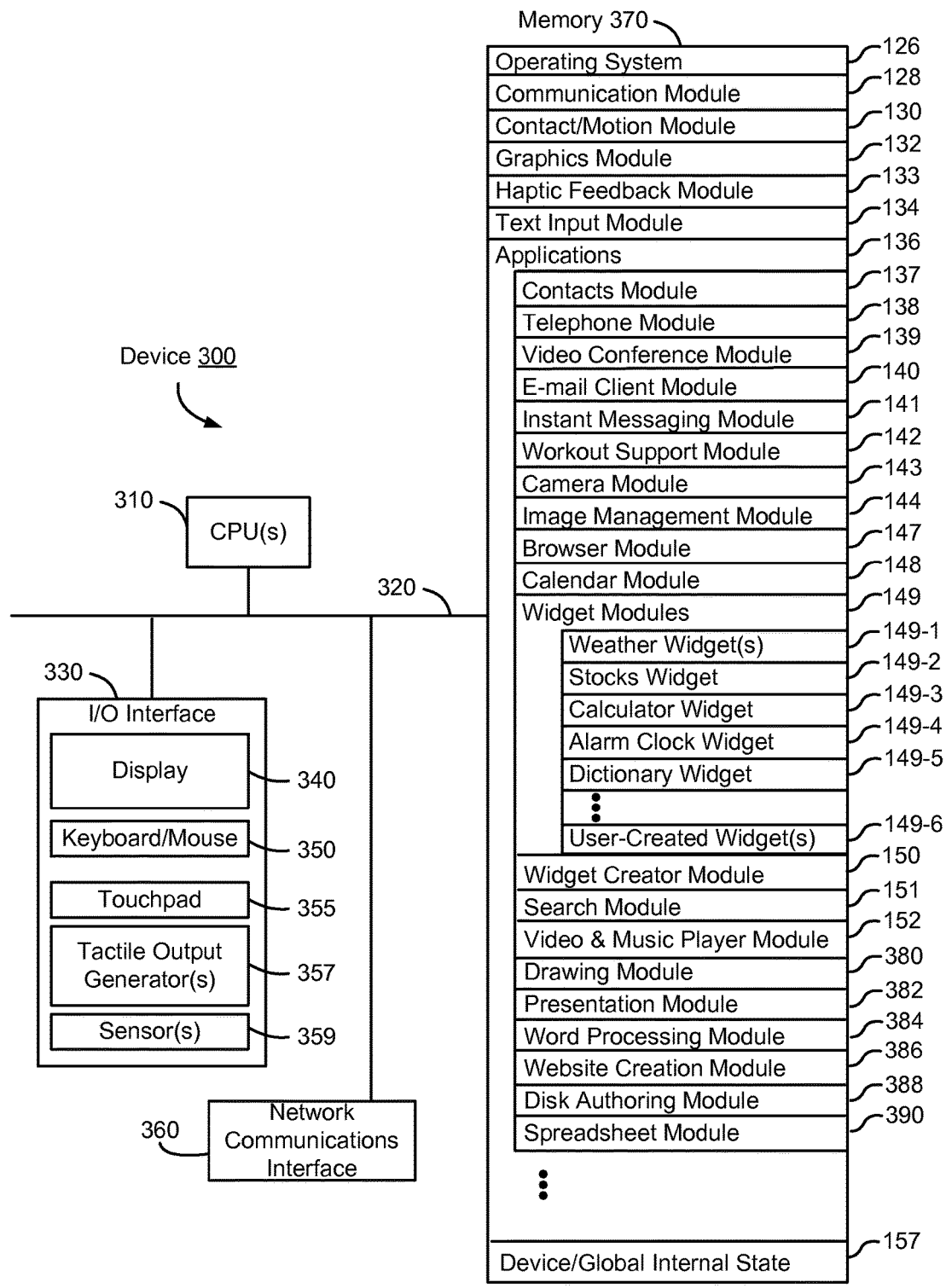
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined thresholds values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  browser module 147;
  calendar module 148;
  widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player module 152, which is, optionally, made up of a video player module and a music player module;
  notes module 153;
  map module 154; and/or
  online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 are, optionally, used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 are, optionally, used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 are, optionally, used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
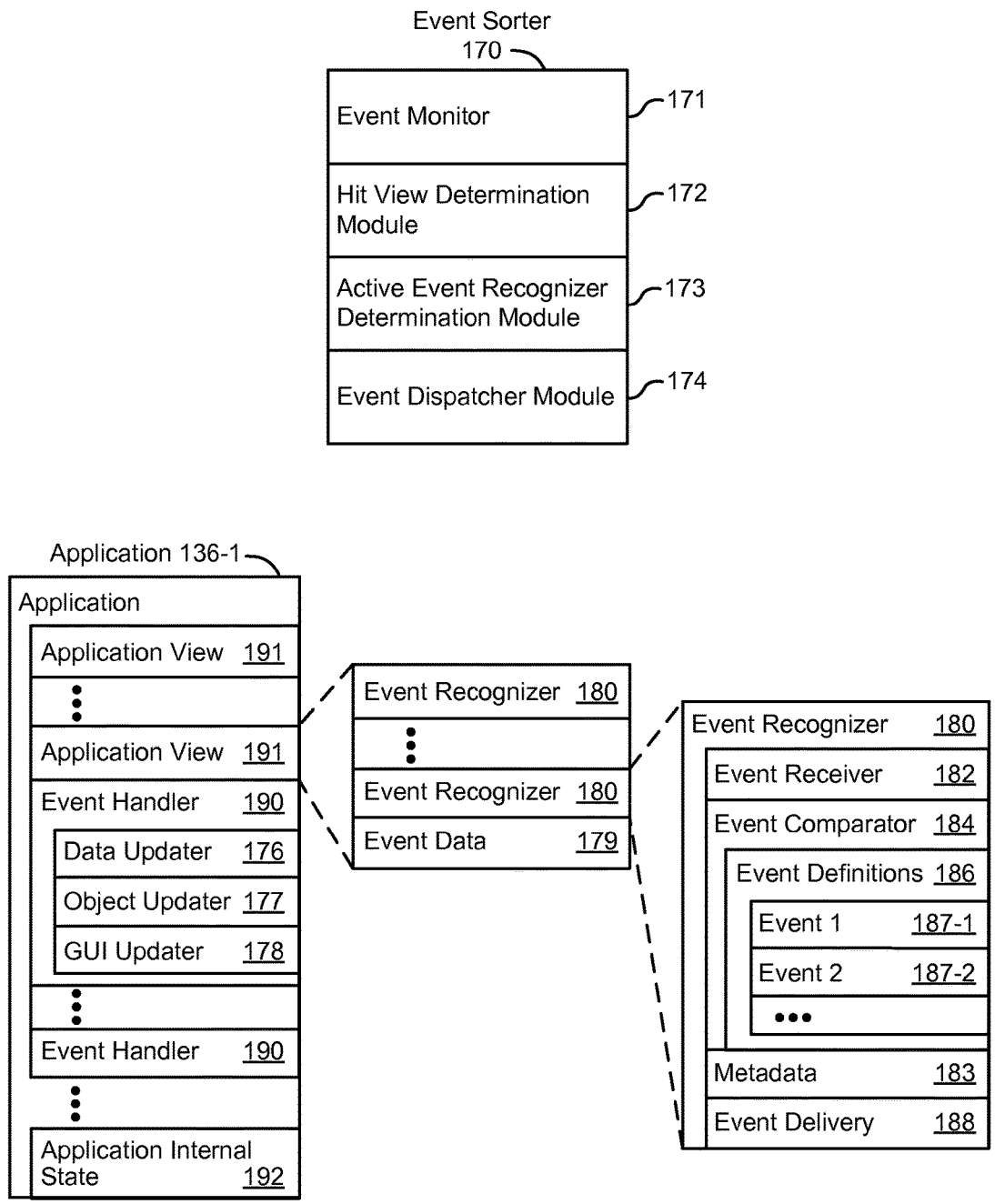
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-13, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
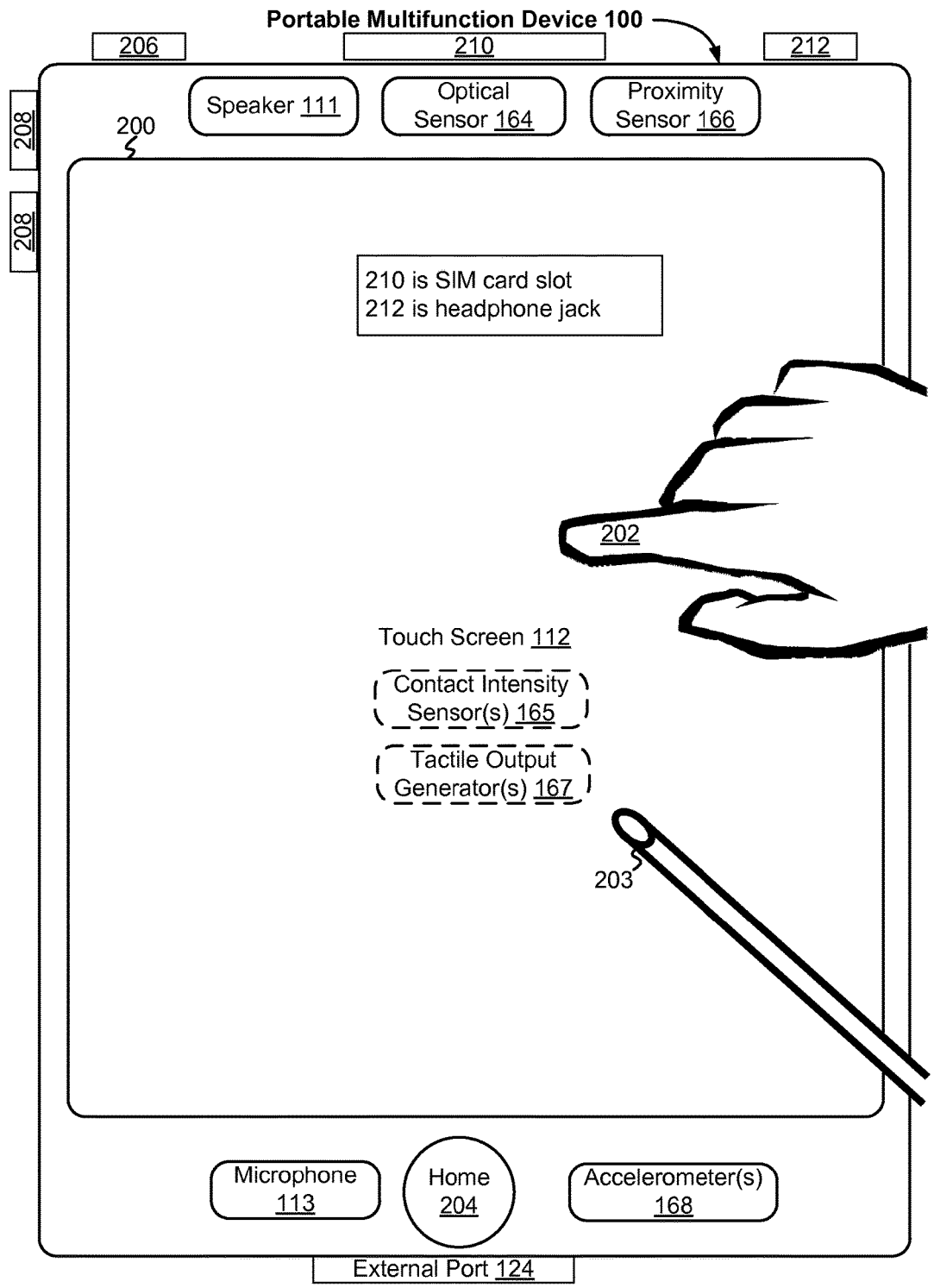
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that is, optionally, implemented on portable multifunction device 100.

Figure 4A:
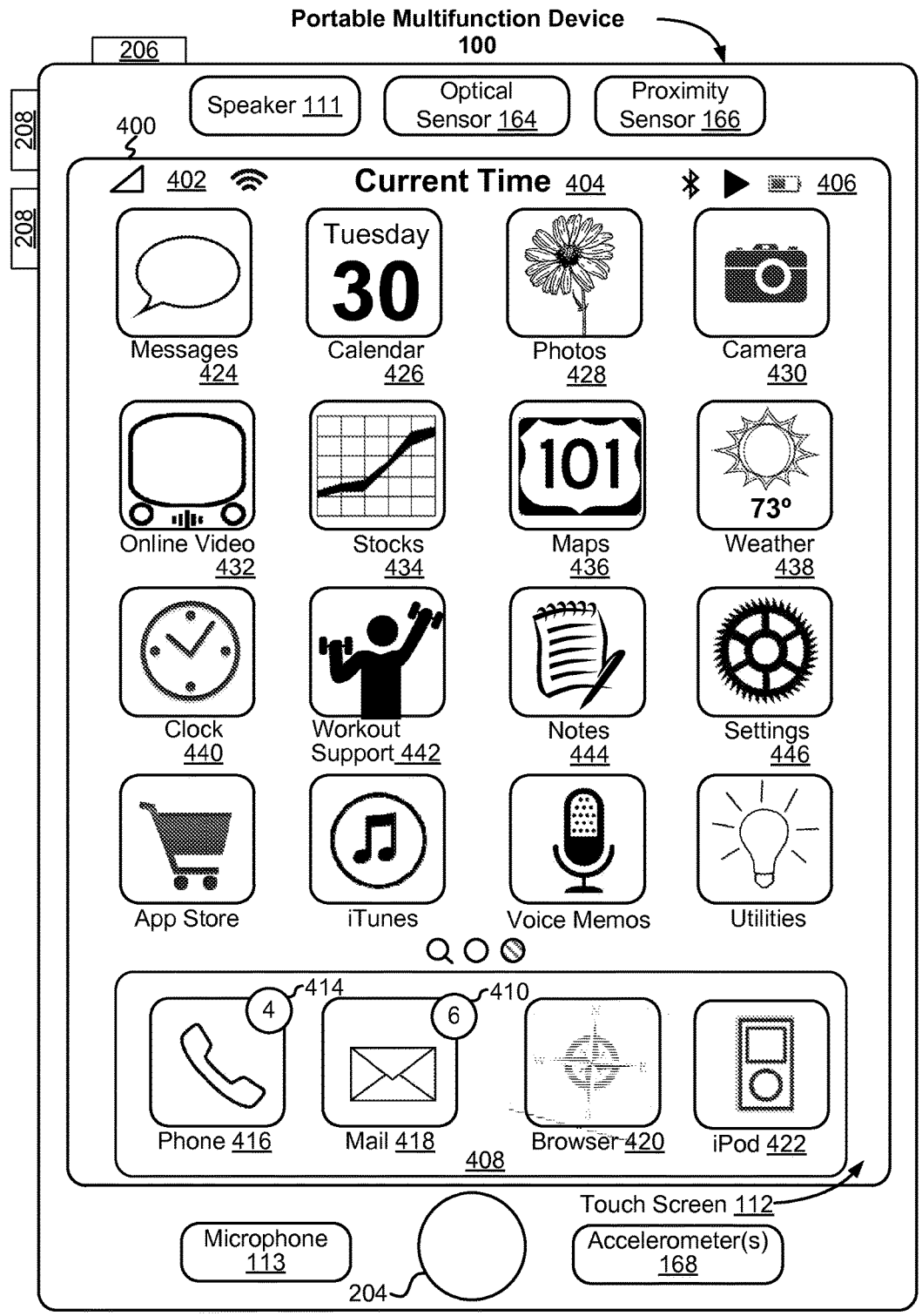
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Text;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video"
  Icon 434 for stocks widget 149-2, labeled "Stocks;"
  Icon 436 for map module 154, labeled "Map;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, which provides access to settings for device 100 and its various applications 136.

It should be noted that the icon labels illustrated in FIG. 4A are merely exemplary. For example, icon 422 for video and music player module 152 are labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
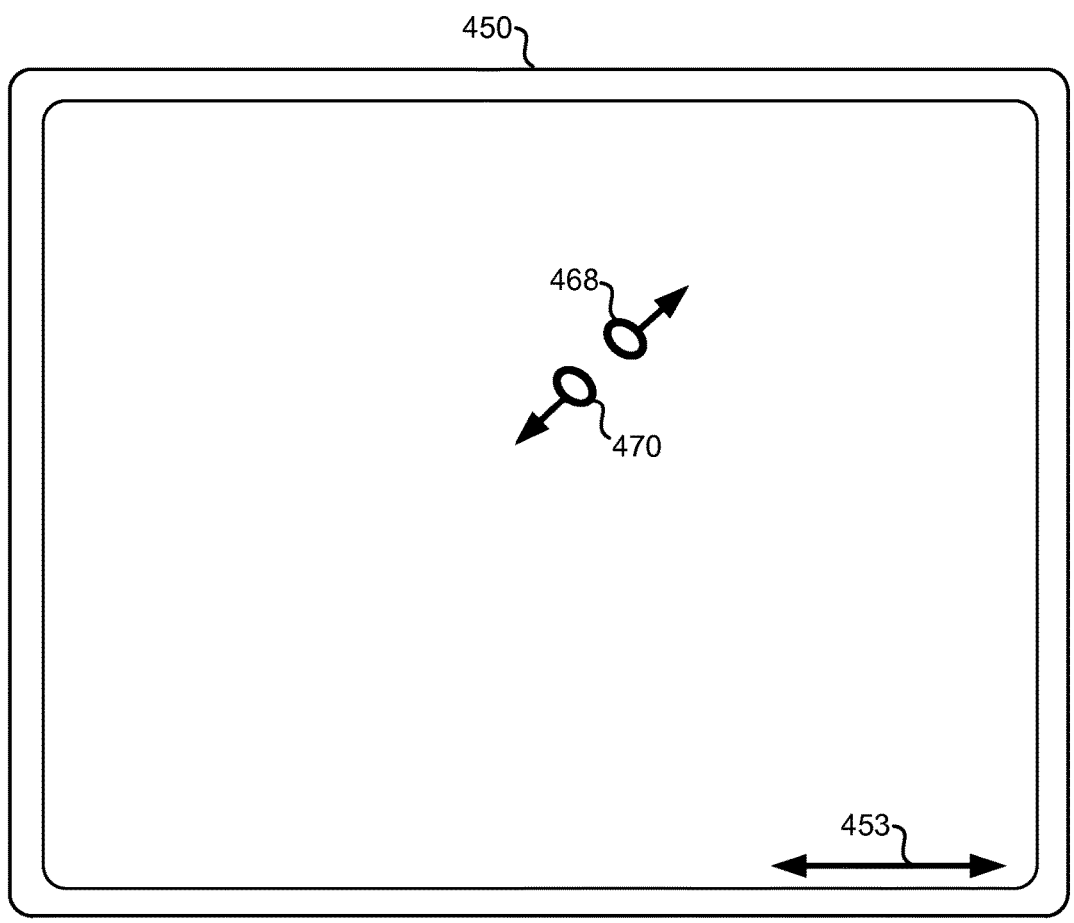
FIG. 4B illustrates an exemplary user interface for a multifunction device with a touch-sensitive surface that is separate from the display in accordance with some embodiments.
Figure 4B:
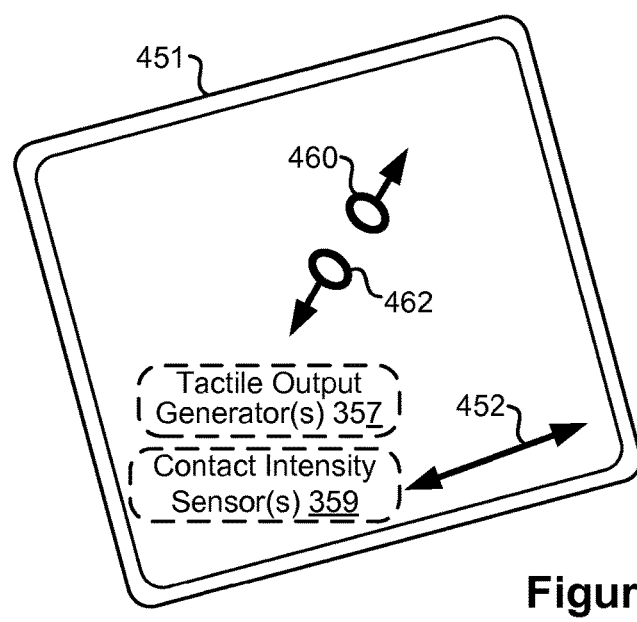

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments the touch sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or touch screen 112 in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

User Interfaces and Associated Processes

Attention is now directed towards embodiments of user interfaces ("UI") and associated processes that may be implemented on an electronic device with a display and a touch-sensitive surface, such as device 300 or portable multifunction device 100. A content hierarchy organizes content into a category tree that represents a plurality of categories and organizes the categories into a hierarchy of categories. Each category is a node in the category tree. The user interfaces described herein are associated with nodes in a content item category tree and enable users to navigate content items of the category tree.

Figure 5:
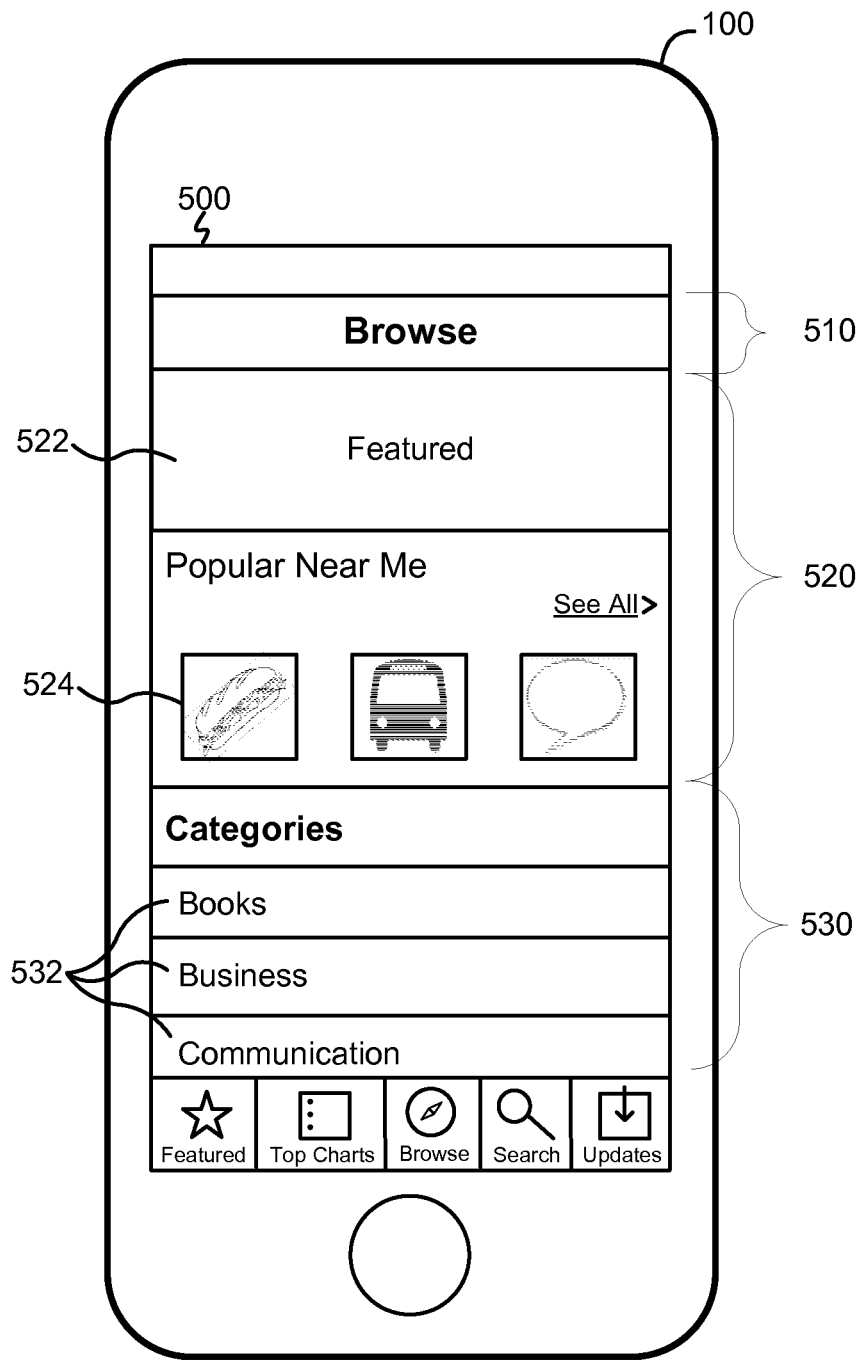
FIG. 5 illustrates an exemplary user interface associated with a root node of a category tree in accordance with some embodiments.

FIG. 5 illustrates a user interface 500 associated with a root node, or a top-level node, of the content item category tree. The root node user interface 500 is displayed by a user device, such as the portable multifunction device 100. As shown in FIG. 5, one embodiment of the root node user interface 500 includes a header region 510, a content item region 520, and a child-node region 530. Other embodiments of the root node user interface 500 may include additional, fewer, or different regions.

The header region 510 identifies the node of the category tree with which the user interface 500 is associated. As the user interface 500 is associated with the root node of the category tree, the header region 510 includes a high-level identifier of the category tree. For example, the header region 510 includes an identifier such as "Browse," "All," a name of the category tree, or any other identifier signaling a root node of the category tree.

The content item region 520 includes one or more representations of one or more categories in the category tree or one or more content items in the category tree. The content items included in the content item region 520 are selected from the categories beneath the root node in the category tree. In the example shown in FIG. 5, the content item region 520 includes a featured content items region 522 and representations 524 of one or more content items. The featured content items region 522 may include a representation of one or more content items or a category of content items selected by an editor, an advertiser, or another individual. For example, the featured content items region 522 includes a curated list of content items. As another example, the featured content items region 522 advertises a category of content items, such as basketball-related games, rather than particular content items. The example representations 524 of content items shown in FIG. 5 correspond to content items downloaded frequently by users near the location of the device 100. The representations 524 displayed on the user interface 500 may be updated on a relatively frequent basis (e.g., daily). Numerous other mechanisms for selecting the content items included in the content item region 520 may alternatively be used. A user can interact with the representations 524 of content items in the content item region 520 to, for example, view information about a corresponding content item and download the content item, without navigating through the category tree. For example, in response to a user selection of one of the content item representations 524, the device 100 displays a page describing the corresponding content item and enabling the user to download or purchase the content item.

The child-node region 530 comprises selectable identifiers 532 of categories in the category tree. In some embodiments, the identifiers 532 identify categories that are at the same level in the category tree. A selection of one of the identifiers 532 causes the device 100 to navigate to a corresponding node in the category tree. Navigating to a node within the category tree is described further with respect to FIGS. 8A-E.

Figure 6A:
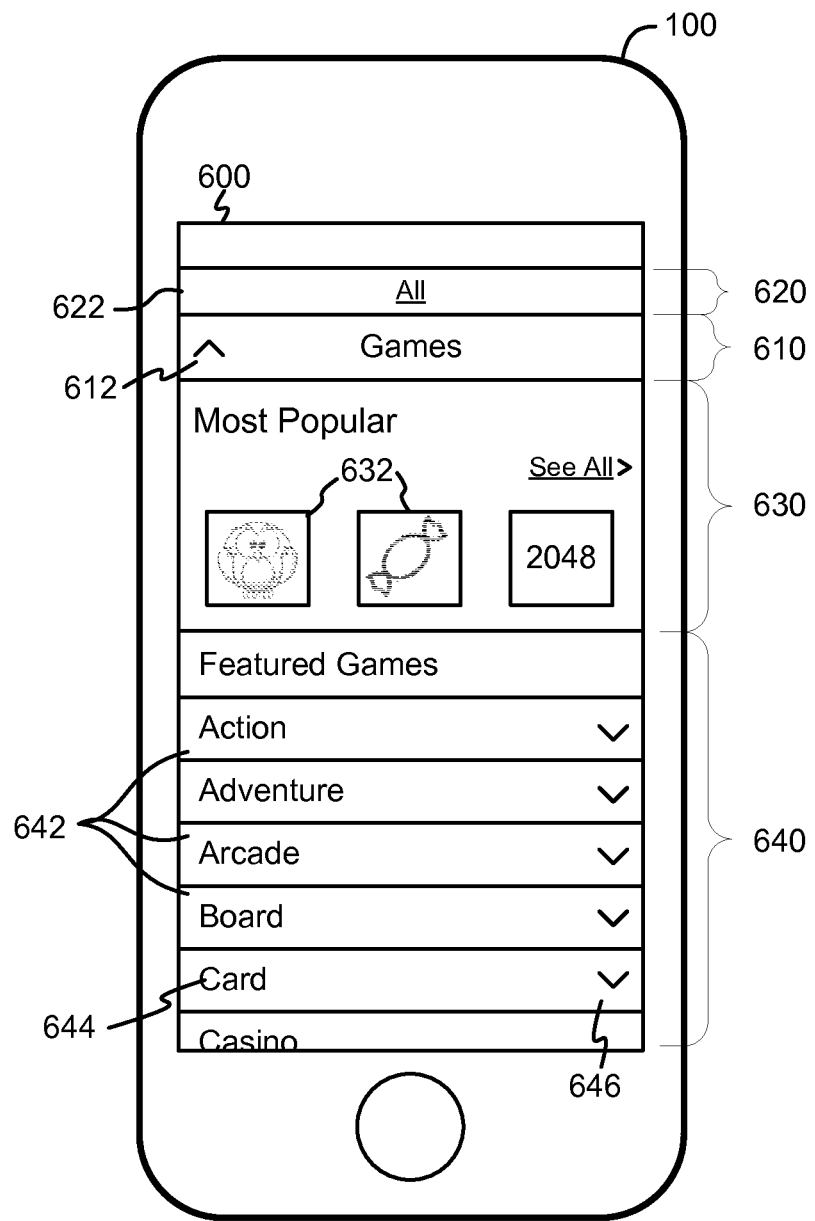
FIGS. 6A-6D illustrate an exemplary user interface associated with an internal node of a category tree in accordance with some embodiments.

FIGS. 6A-6D illustrate a user interface 600 displayed by the device 100. The user interface 600 is associated with an internal node in the category tree, or a node below the root node having one or more child nodes. For example, the user interface 600 is displayed in response to a user selection of one of the identifiers 532 in the root node user interface 500. In some embodiments, as shown in FIG. 6A, the internal node user interface 600 includes a header region 610, a context region 620, a content item region 630, and a child-node region 640. Other embodiments of the internal node user interface 600 may include additional, fewer, or different regions.

The header region 610 identifies the node of the category tree associated with the user interface 600. In the example of FIG. 6A, the header region 610 identifies the user interface 600 as being associated with a "Games" category of the category tree. In some embodiments, the header region 610 includes a caret 612 as a selectable link to a higher-level node in the category tree. For example, the device 100 navigates to the node one level above the node associated with the user interface 600 in response to a selection of the caret 612.

The context region 620 includes one or more labels 622 identifying one or more ancestor nodes of the node associated with the user interface 600. In the case illustrated in FIG. 6A, the root node of the category tree is the ancestor node of the user interface 600. Accordingly, the label 622 identifies the root node. In some embodiments, as shown in FIG. 6, the context region 620 and header region 610 are arranged vertically on the device 100, such that the label 622 is displayed above the header text. The label 622 is displayed in a smaller size than the header text to distinguish the label 622 from the header text in some embodiments. The label 622 may additionally or alternatively be displayed in a different color, a different font, a different font face, or be otherwise distinguished from the header text. In some embodiments, the label 622 is a selectable label. In response to a selection of the label 622, the device 100 displays the user interface associated with the node represented by the label 622 (here, the root node user interface 500).

The content item region 630 includes representations 632 of content items belonging to the node associated with the user interface 600. The representations 632 are, for example, images associated with the content items, titles of the content items, or the like. The content items represented by the representations 632 are selected from a sub-tree of the category tree that is rooted at the node associated with the user interface 600. For example, the content items region 630 includes one or more content items that belong to the node associated with the user interface 600 or a child node of the node associated with the user interface 600. In various examples, the content item representations 632 included in the content item region 630 correspond to content items from the sub-tree that have been downloaded most frequently by all users, are popular near the location of the device 100, have a rating above a threshold, or were selected by a human curator. The content items included in the content item region 630 may be selected by any of a variety of other methods.

The child-node region 640 includes one or more selectable identifiers 642 of child nodes of the node associated with the user interface 600. In some embodiments, each child-node identifier 642 includes a title 644 and a caret 646. The title 644 is a name of the corresponding child node, and the caret 646 indicates that the identifier 642 includes one or more child nodes. In place of the caret 646, or in addition to the caret 646, some embodiments of the child-node identifiers include a number of content items in a sub-tree rooted at the corresponding child node. In some embodiments, the titles 644 of the identifiers 642 are displayed to a side of the device 100 to visually distinguish the identifiers 642 from the header text (which is centered). The identifiers 642 are selectable links to navigate to a user interface associated with the corresponding child node. For example, the device 100 navigates to a user interface associated with a child node in response to a user selection of the identifier 642 corresponding to the child node.

Figure 6B:
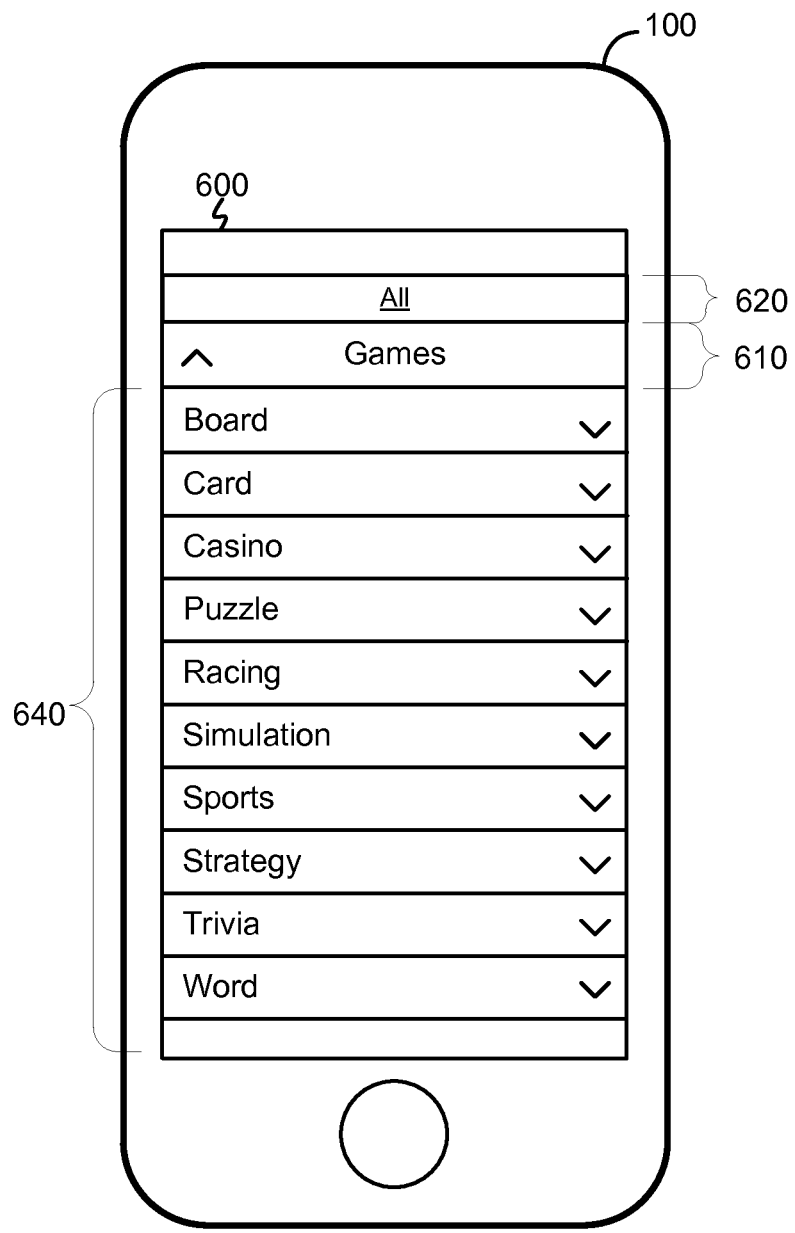

The child-node region 640 may include identifiers for more child nodes than can be displayed at one time on the device 100. Accordingly, in some embodiments, the child-node region 640 is a vertically scrollable or expandable list. FIG. 6B illustrates an example of the child-node region 640 scrolled down to reveal identifiers of additional child nodes. In the example shown in FIG. 6B, the header region 610 and context region 620 remain in place while the content item region 630 and child-node region 640 scroll together. In this case, the content item region 630 may scroll off the screen to reveal more child-node identifiers 642 (as shown in FIG. 6B). In some embodiments, the content item region 630 and child-node region 640 are independently scrollable. For example, the content item region 630 may remain in substantially the same position on the device 100 while the child-node region 640 scrolls downward to reveal additional child-node identifiers.

Figure 6C:
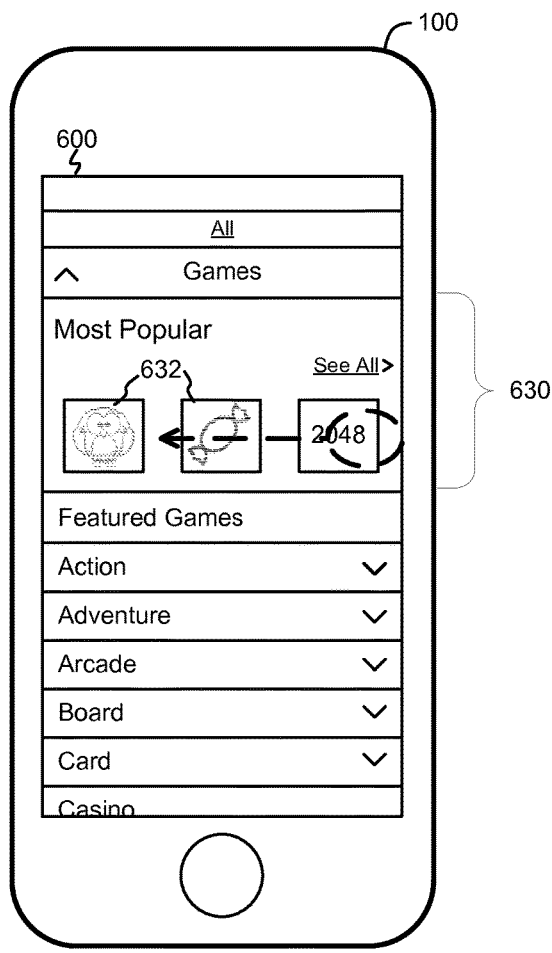
Figure 6D:
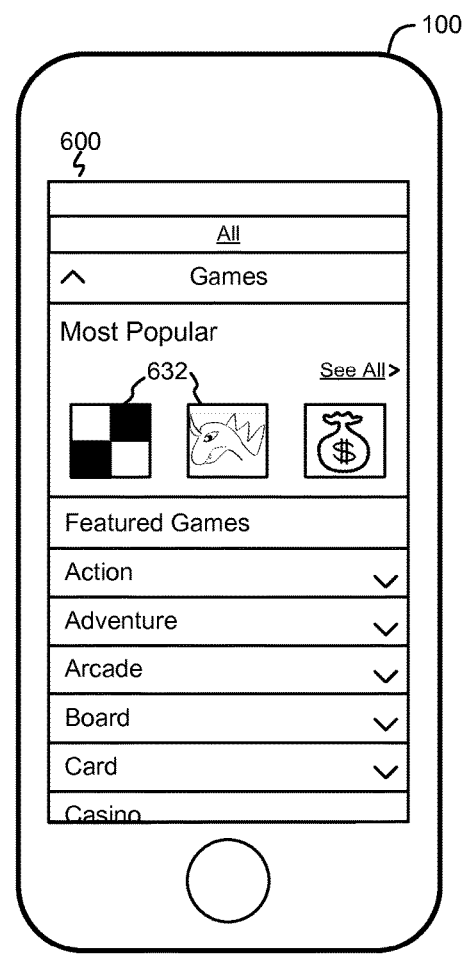

In some embodiments, the content item region 630 is also scrollable or expandable to reveal additional content items selected from the sub-tree rooted at the node associated with the user interface 600. FIGS. 6C and 6D illustrate an example of scrolling through content item representations 632. In the example illustrated in FIGS. 6C-6D, the content item representations 632 are scrollable in response to a horizontal user input received in association with the content item region 630. For example, a swipe from right to left in the content item region 630 on a touch sensitive surface, as shown in FIG. 6C, scrolls to a next set of content item representations 632, as shown in FIG. 6D.

A user can also interact with the content item region 630 to view other content items. FIGS. 7A-B illustrate an example user interaction with a selectable user interface element in the content item region 630 and a user interface displayed in response to selection of the element. In some embodiments, a selection of the "See All" link 634 shown in FIG. 7A causes the device 100 to display an interface 700 with one or more representations 702 of content items, shown in FIG. 7B. In some embodiments, the representations 702 include more information about content items than the representations 632 of the content item region 630. For example, some embodiments of the content item representations 702 in the user interface 700 include extra information about the corresponding content items that is not included in the content item region 630, such as a title, a publisher, a rating, or a thumbnail image associated with each content item.

As described above, the device 100 navigates to a user interface associated with a child node in response to a selection of a respective one of the child-node identifiers. To navigate to the child-node user interface, the device 100 displays a transition from the user interface 600 to the user interface associated with the respective child node. An example transition is illustrated in FIGS. 8A-8E. In general, the transition moves the selected child-node identifier toward the header region 610 while maintaining display of the selectable label 622 of the context region 620. The header text is transformed into a selectable label to identify the category associated with the header text as an ancestor node of the selected child node. Furthermore, the selected child-node identifier is transformed into a new header identifying the selected child node.

Figure 8A:
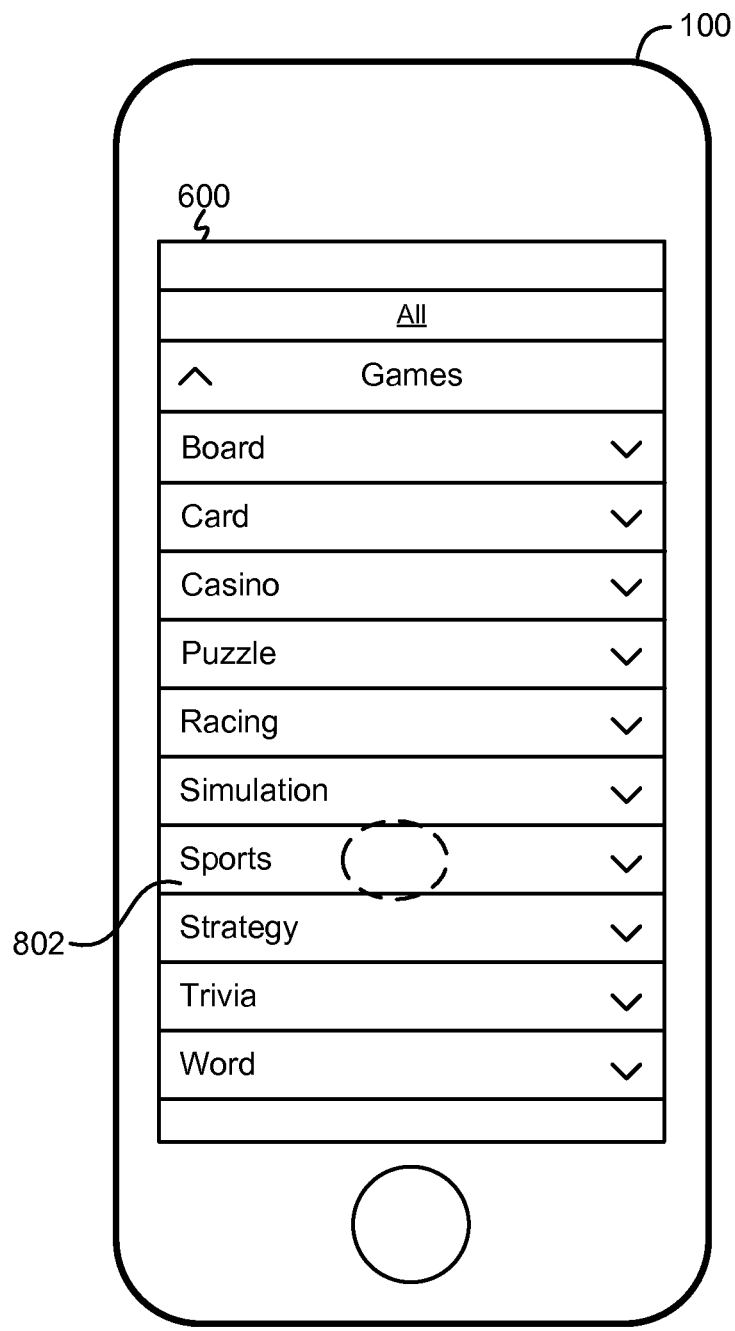
FIGS. 8A-8E illustrate an exemplary transition from a user interface associated with a first internal node of a category tree to a user interface associated with a child node in accordance with some embodiments.
Figure 8B:
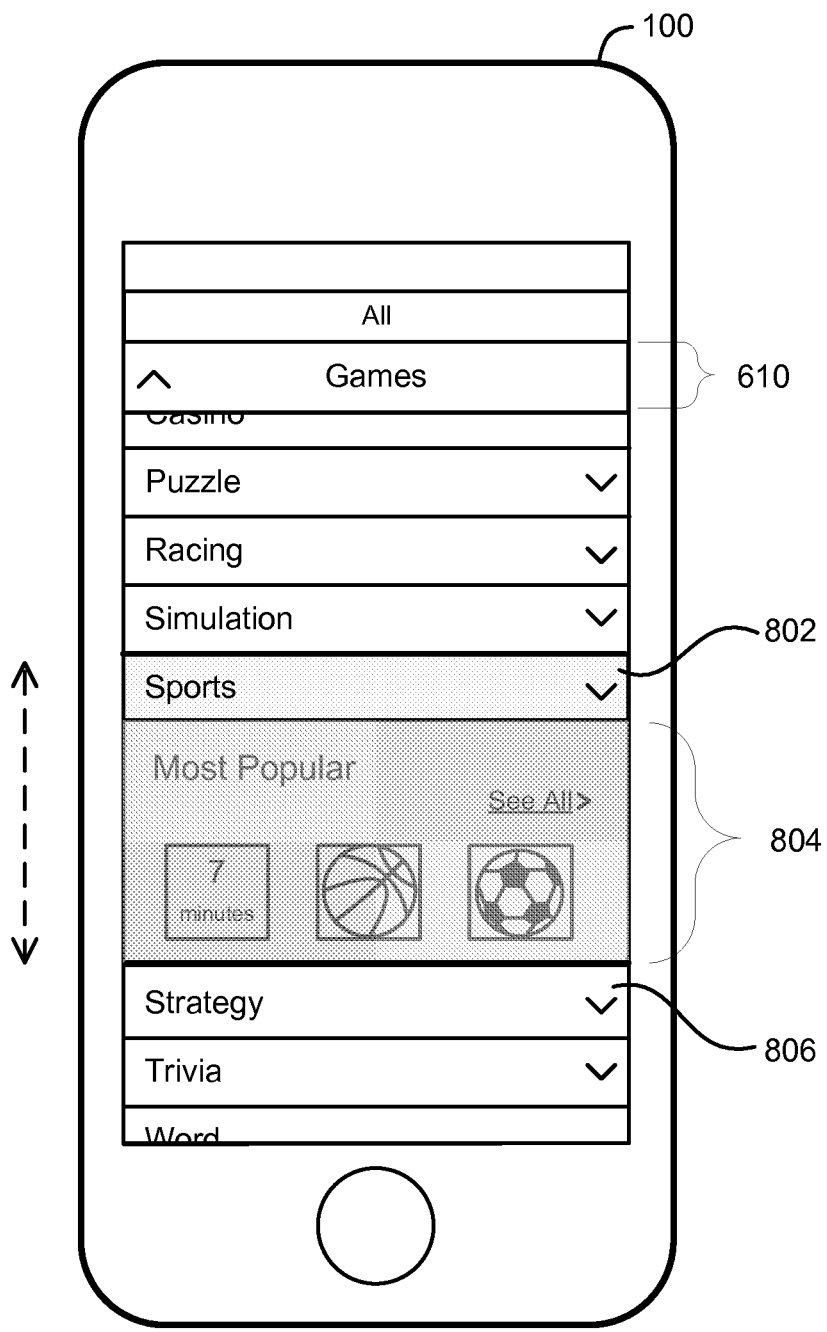

As shown in FIG. 8A, the device 100 receives a selection of a child-node identifier 802 corresponding to sports games. In response to detecting the selection of the sports identifier 802, the device 100 begins moving the sports identifier 802 toward the header region 610 to begin displaying a portion 804 of an interface associated with the respective child node, as shown in FIG. 8B. In some embodiments, an identifier below the selected identifier 802 (the "strategy" child-node identifier 806 in the example illustrated in FIG. 8B) begins moving downward. Thus, the portion 804 of the interface associated with the child node expands in two vertical directions on the device 100.

In some embodiments, a shading of the portion 804 of the interface associated with the child node is initially displayed during the transition as a darker color. As the transition progresses, the shading of the displayed portion 804 of the interface associated with the child node becomes progressively lighter. For example, at a beginning of the transition, an initial portion 804 of the child-node interface is darker than the child-node region 640. The shading of the portion 804 becomes progressively lighter and lighter so that at the end of the transition, the child-node interface has a similar appearance to the child-node region 640. The shading serves to visually distinguish the portion 804 of the child-node interface displayed during the transition from the child-node region 640 while maintaining a uniform look for the child-node regions after the transition is complete.

A shading of the respective child-node identifier 802 may also change during the transition. For example, after a selection of the child-node identifier 802 is detected, the child-node identifier 802 may initially be displayed in a darker shading to visually distinguish the selected child-node identifier 802 from the other child-node identifiers of the child-node region 640. As the transition proceeds, the shading of the child-node identifier 802 may become progressively lighter until the child-node identifier 802 has a similar appearance to the header region 610.

Figure 8C:
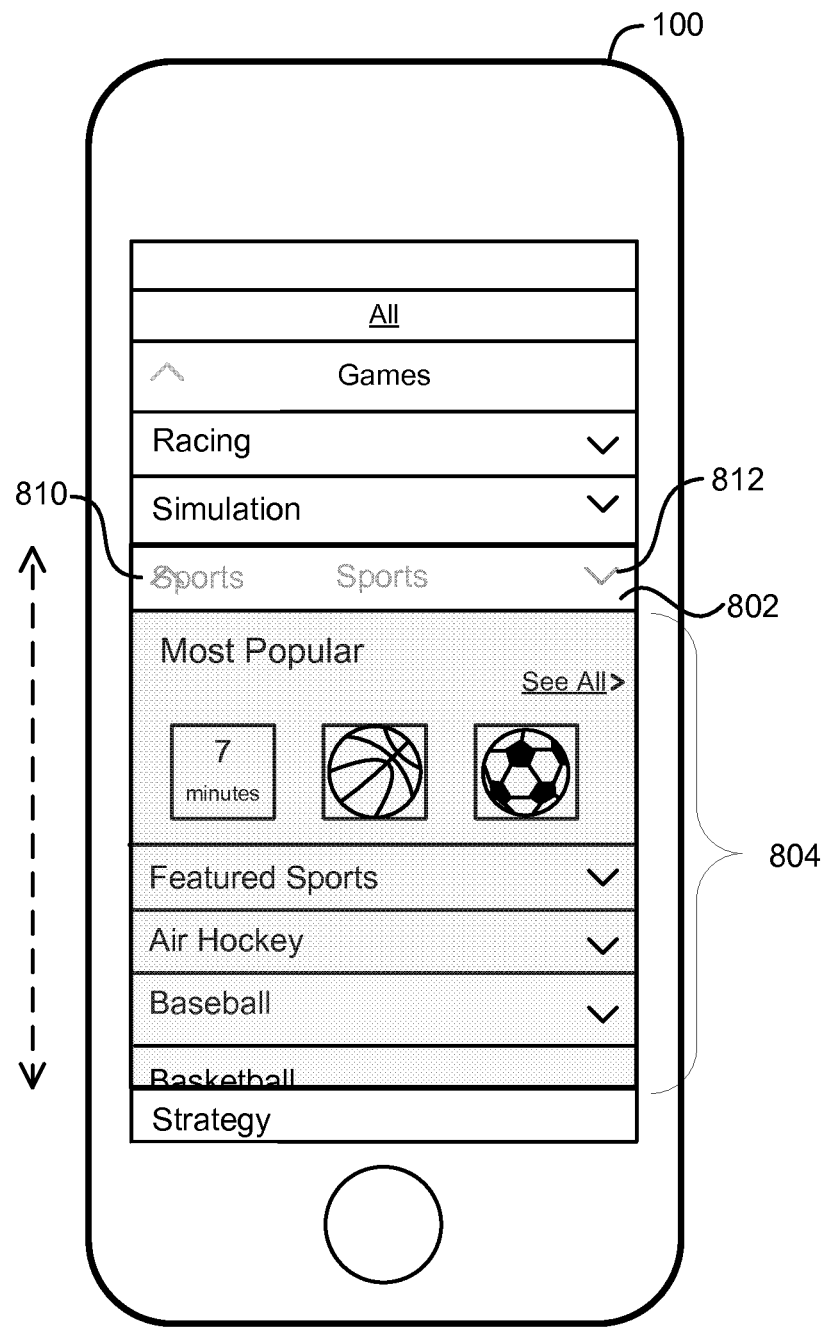

FIG. 8C illustrates the transition at a later stage. As shown in FIG. 8C, the respective child-node identifier 802 continues to move upward on the device 100 to display a larger portion 804 of the interface associated with the child-node identifier 802. In some embodiments, a title 810 on the respective child-node identifier 802 begins to fade away from a side of the child-node identifier 802 and fade into a center of the child-node identifier 802. Furthermore, the caret 812 begins to fade away in some embodiments.

Figure 8D:
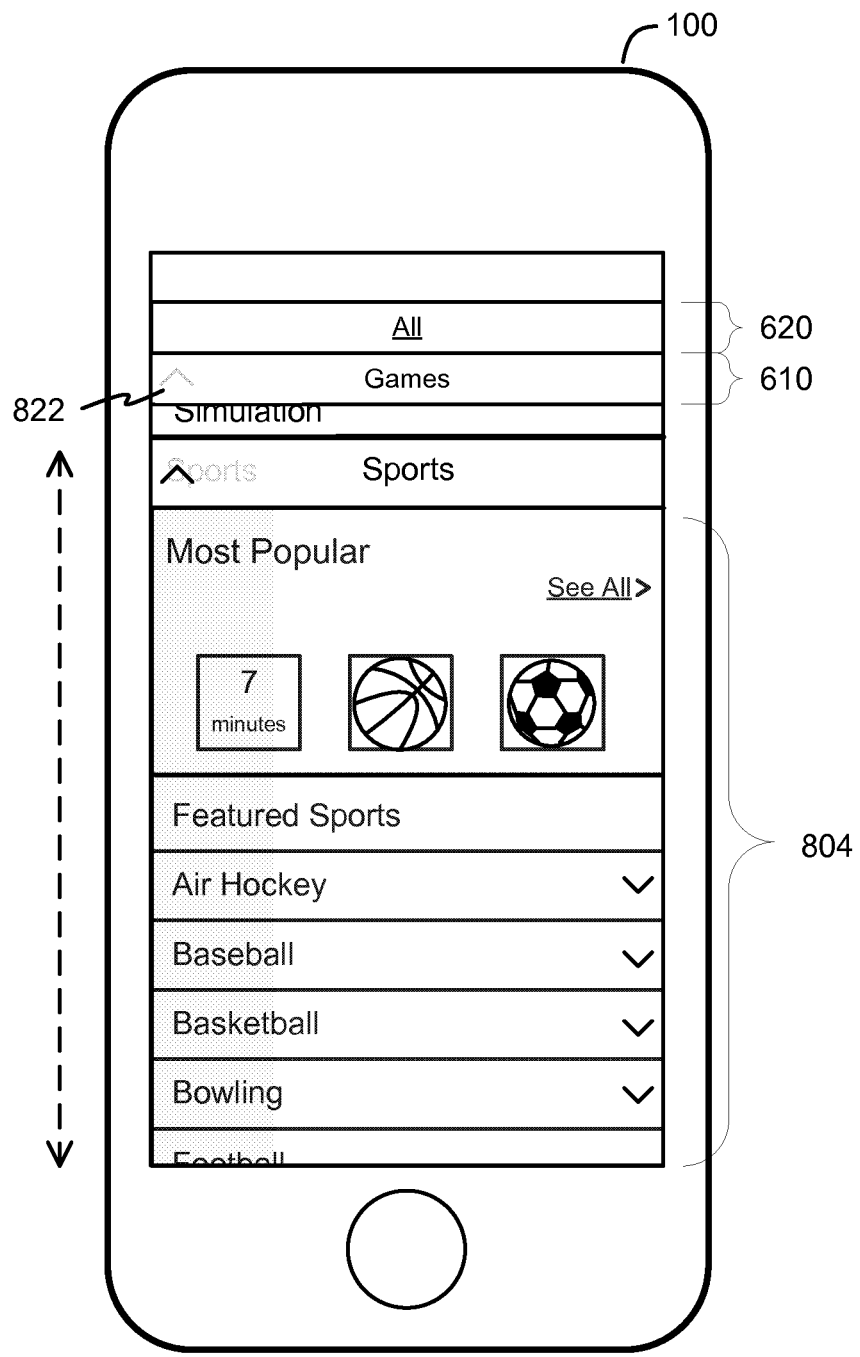

FIG. 8D illustrates the transition when it is nearly complete. At the illustrated stage in the transition, the portion 804 of the user interface associated with the child node occupies a majority of the display of the device 100, and its shading is lighter than its initial shading during the transition. In some embodiments, the header text transforms to be similar in appearance to the context region 620. For example, the caret 822 previously displayed on the header region 610 fades away. The header text may shrink, change colors, or be otherwise transformed to visually distinguish the header text from the respective child-node identifier 802 and transform the header text to be similar in appearance to the context region 620.

Figure 8E:
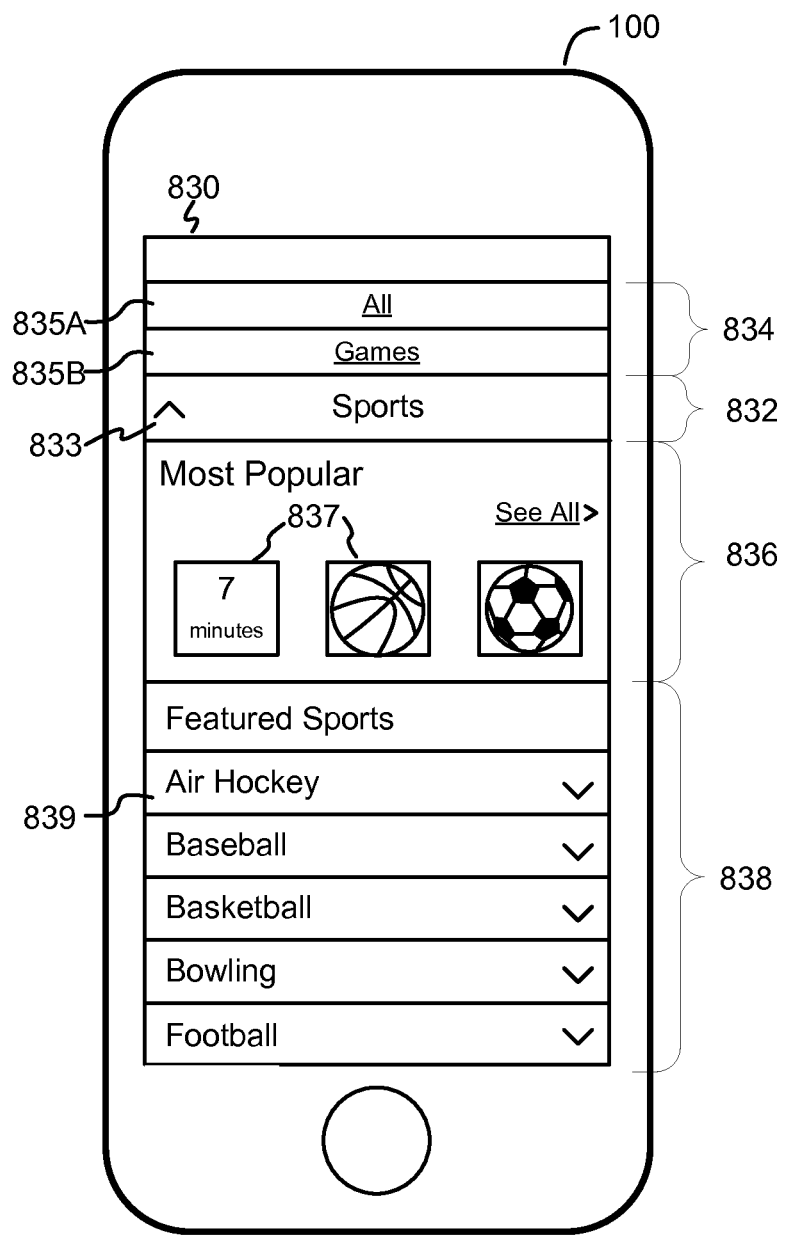

FIG. 8E illustrates an example user interface 830 associated with the selected child-node identifier, displayed at the completion of the transition. In some embodiments, the interface 830 associated with the selected child node includes a header region 832, a context region 834, a content item region 836, and a child-node region 838. Other embodiments of the user interface 830 associated with the selected child node may include additional or fewer regions. Regions of the user interface 830 may be similar to regions of the user interface 600.

The header region 832 identifies the node of the category tree associated with the user interface 830. In the example of FIG. 8E, the header region 832 identifies a "Sports" category. The header region 832 may include a caret 833 as a selectable link to a higher-level node in the category tree. For example, a selection of the caret 833 is interpreted as an input to navigate to the parent node of the node associated with the user interface 830 (that is, the "Games" category in the example of FIG. 8E). In some embodiments, the header region 832 is the header region 610 updated to include information identifying the node associated with the user interface 830.

The context region 834 includes labels 835A-B (collectively, the labels 835) identifying ancestor nodes of the node associated with the user interface 830. In some embodiments, the labels 835 are displayed in a vertical arrangement above the header region 832, and the label 835B for the first internal node is added to a bottom of the vertical arrangement of the labels 835. In some embodiments, the labels 835 are displayed in a smaller size than the header text to distinguish the labels 835 from the header text. The labels 835 may additionally or alternatively be displayed in a different color, a different font, a different font face, or be otherwise distinguished from the header text. Furthermore, the labels 835 may be selectable labels, such that a selection of one of the labels 835 causes the device 100 to display a user interface associated with the node corresponding to the respective label.

The content item region 836 includes representations 837 of content items associated with the node associated with the user interface 830, such as images associated with the content items, titles of the content items, or the like. The content items represented by the representations 837 are selected from a sub-tree of the category tree that is rooted at the node associated with the user interface 830. In various examples, the content items included in the content item region 836 are content items from the sub-tree that have been downloaded most frequently by all users, are popular near the location of the device 100, or were selected by a human curator. The content items included in the content item region 836 may alternatively be selected by any of a variety of other methods.

The child-node region 838 includes identifiers 839 of child nodes of the node associated with the user interface 830. The identifiers 839 are selectable links to navigate to a user interface associated with the corresponding child node. For example, the device 100 navigates to a user interface associated with a child node in response to a user selecting the identifier 839 corresponding to the child node. In some embodiments, the child-node region 838 is the child-node region 640 updated to include identifiers corresponding to one or more child nodes of the node associated with the user interface 830.

Figure 9A:
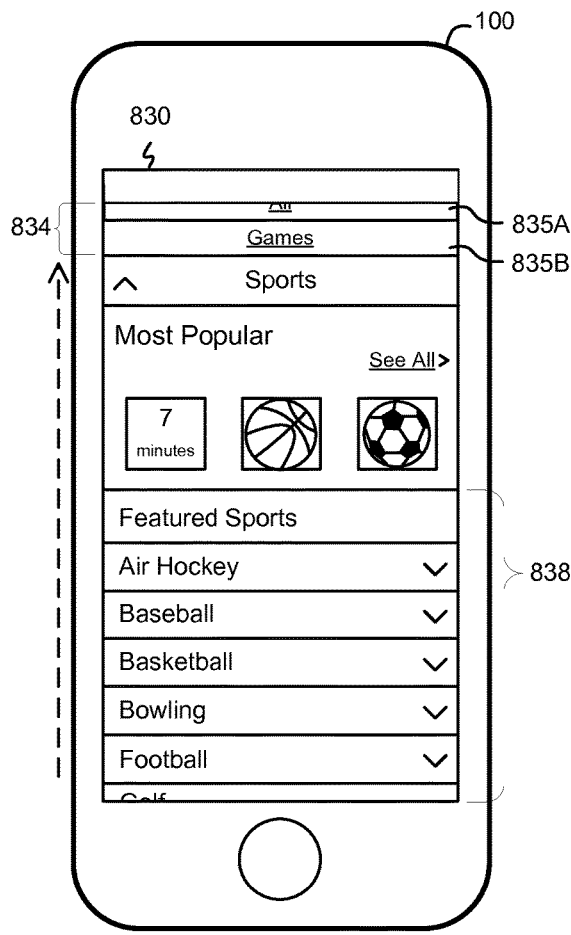
FIGS. 9A-9B illustrate scrolling child node identifiers in accordance with some embodiments.
Figure 9B:
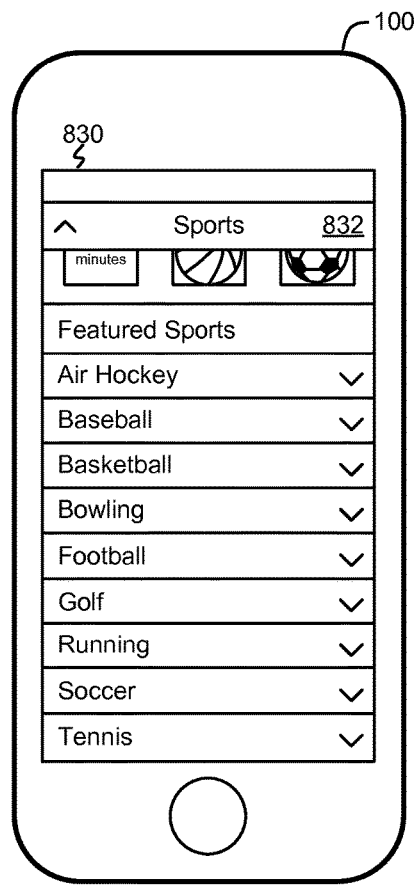

The child-node region 838 may include identifiers for more child nodes than can be displayed at one time on the device 100. Accordingly, as shown in FIGS. 9A-B, the child-node region 838 may be scrollable to reveal additional child-node identifiers. The device 100 detects a request to move content of the user interface 830 in a first direction (e.g., an upward direction, or a direction that scrolls downward through the user interface 830). For example, the device 100 detects an upward swipe gesture on a touch sensitive surface or a movement of a scroll wheel corresponding to an upward movement of the child-node region 838. In some embodiments, at least a portion of the context region 834 scrolls off the display of the device 100 to provide space to display one or more additional child-node identifiers in response to the request to move content in the upward direction. For example, FIG. 9A illustrates the label 835A has been scrolled partially off the display, leaving only the label 835B intact. As a user continues to scroll down the list of child-node identifiers (moving the identifiers upward on the device 100), as shown in FIG. 9B, the labels 835A and 835B scroll completely off the display. In some embodiments, the header region 832 remains on the display to provide context for the list of child-node identifiers, while the child-node identifiers slide under the header region 832. The header region 832 may shrink to provide additional space on the display.

In some embodiments, scrolling the context region 834 at least partially off the display enables more child-node identifiers to be displayed on the display. By reducing the amount of scrolling that a user needs to do to identify and select a child node from the child-node identifier 839, a more intuitive and efficient user interface is created.

Figure 9C:
FIGS. 9C-9D illustrate expanding a context region in response to a user interface scrolling upward in accordance with some embodiments.
Figure 9D:
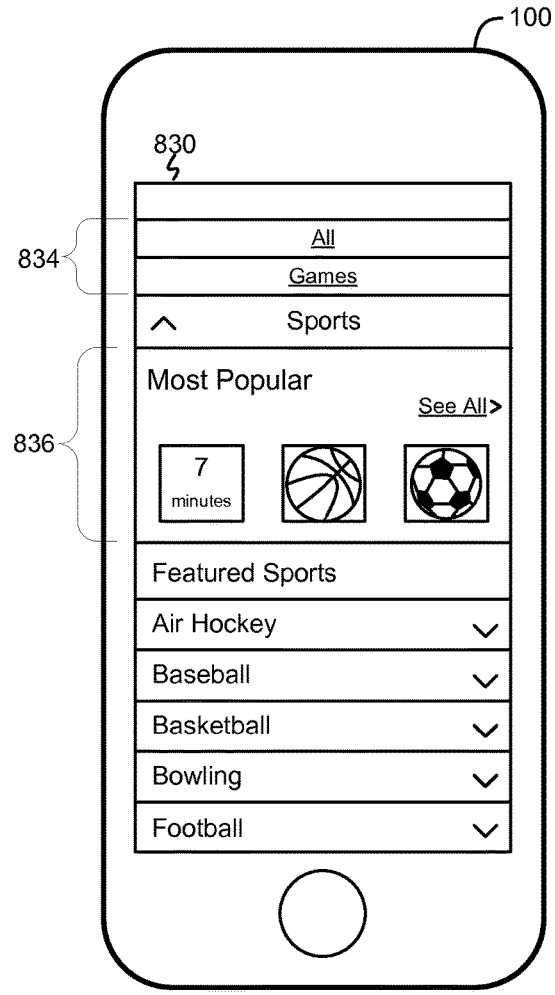

In some embodiments, the context region 834 is displayed again when a request is received to move content on the display in a second direction (e.g., a direction that is different to or opposite of the first direction). An example embodiment of redisplaying the context region 834 in response to a request to move content downward is illustrated in FIGS. 9C-D. As shown in FIG. 9C, a user input to scroll up through the child-node identifiers is received, causing the child-node identifiers to move downward on the device 100. The context region 834 scrolls onto the display as the child-node identifiers move downward on the device 100, as shown in FIG. 9D. The context region 834 may be redisplayed and/or scrolled into view in response to receiving the input. Alternatively, the context region 834 may be redisplayed/scrolled when a top of the content item region 836 is reached. That is, the context region 834 may remain scrolled off the display while the user interface 830 is scrolled up to reveal a top of the content item region 836. If a user input to scroll up is received after the top of the content item region 836 is displayed, the context region 834 is redisplayed/scrolled into view.

Figure 9E:
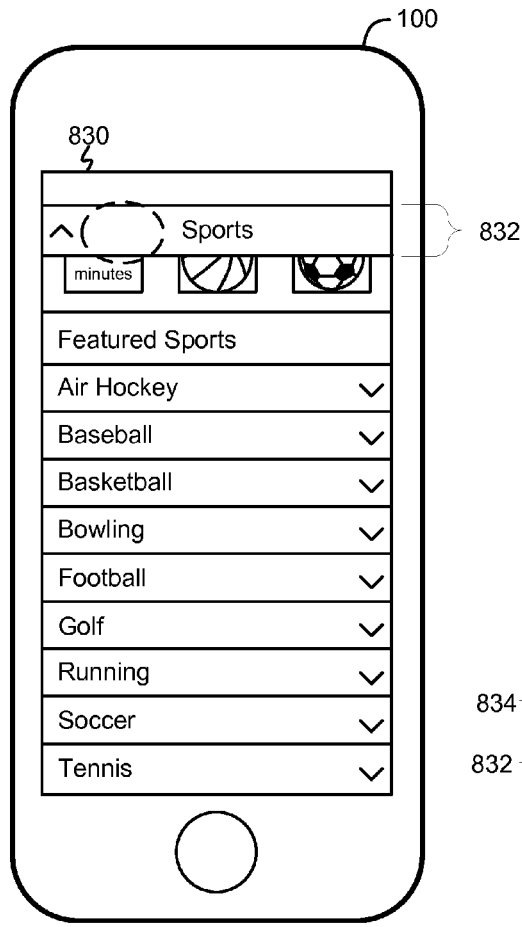
FIGS. 9E-9F illustrate expanding a context region in response to an input at a header in accordance with some embodiments.
Figure 9F:
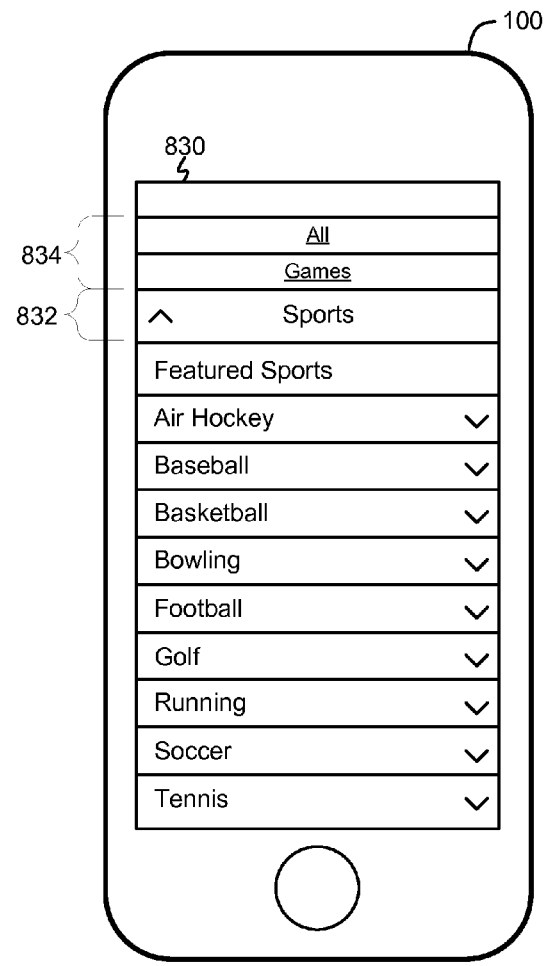

In some embodiments, the context region 834 is displayed again when a user input is received at the header region 832. FIG. 9E illustrates a tap input received in the header region 832 on a touch sensitive surface. Other types of inputs may alternatively be received, such as a mouse click in the header region 832. In response to receiving the user input in the header region 832, the context region 834 is redisplayed/scrolled into view, as illustrated in FIG. 9F. As the context region 834 is redisplayed/scrolled, the context region 834 may cover a portion of the content item region 836 and/or a portion of the child-node region 838. For example, as shown in FIG. 9F, the redisplay/scrolling of the context region 834 causes the context region 834 and the header region 832 to cover the content item region 836. A user may scroll up through the interface 830 to display the content item region 836 after the context region 834 has been redisplayed/scrolled. In some embodiments, the expansion of the context region 834 causes the interface 830 to move downward on the device 100 by a corresponding amount, shifting a bottom portion of the interface 830 off the display.

By interacting with the user interface 830, a user can navigate to user interfaces associated with child nodes or ancestor nodes. A user interface associated with an ancestor node is displayed in response to detection of a selection of one of the labels 835 or the caret 833, while a user interface associated with a child node is displayed in response to detection of a selection of one of the child-node identifiers 839.

Figure 10A:
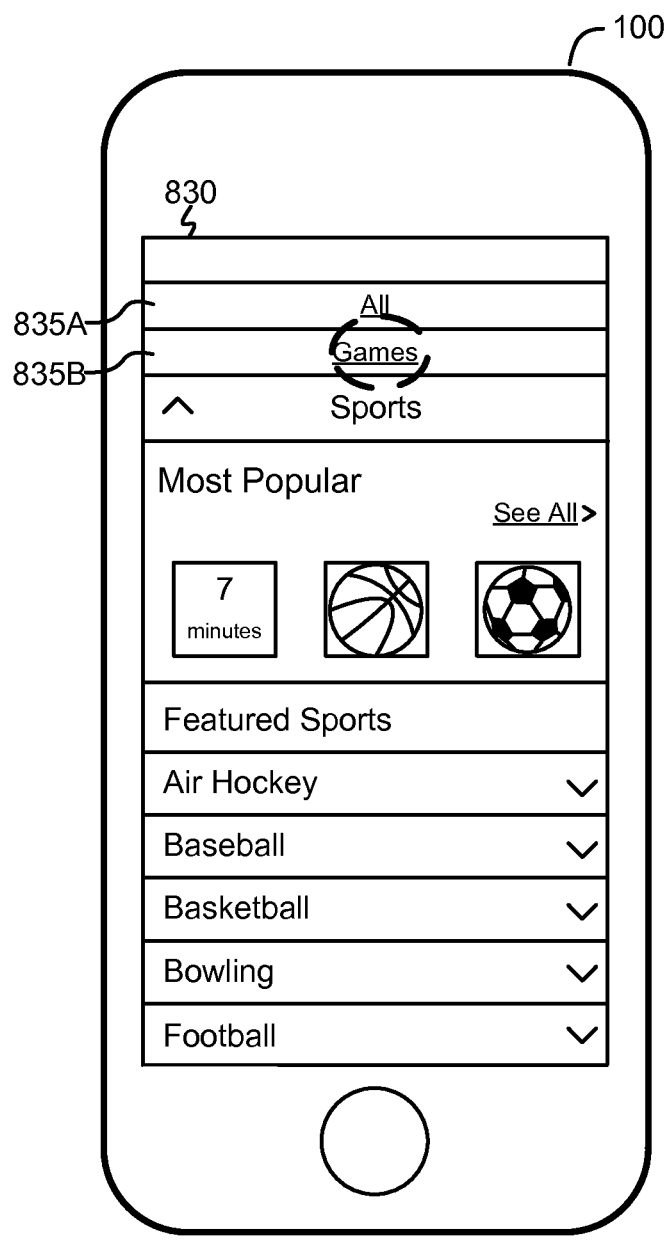
FIGS. 10A-10E illustrate an exemplary transition from a user interface associated with an internal node of a category tree to a user interface associated with an ancestor node in accordance with some embodiments.
Figure 10B:
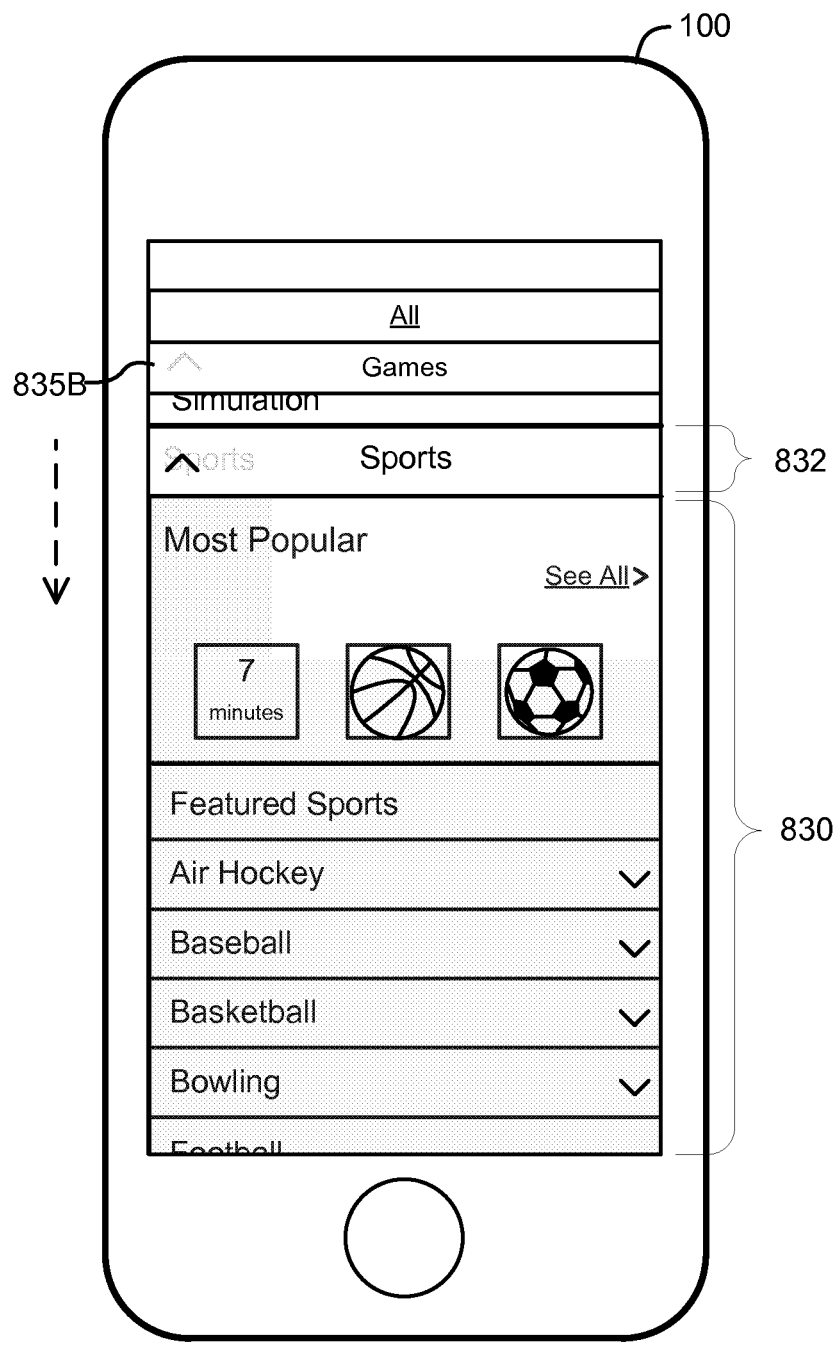

FIGS. 10A-E illustrate a transition to navigate from the user interface 830 to a user interface associated with an ancestor node, according to one embodiment. As shown in FIG. 10A, a user input is received to navigate to an ancestor node. For example, a selection of the label 835B is detected. In response to detecting the selection of the label 835B, the device 100 begins moving the header text downward, as shown in FIG. 10B.

Figure 10C:
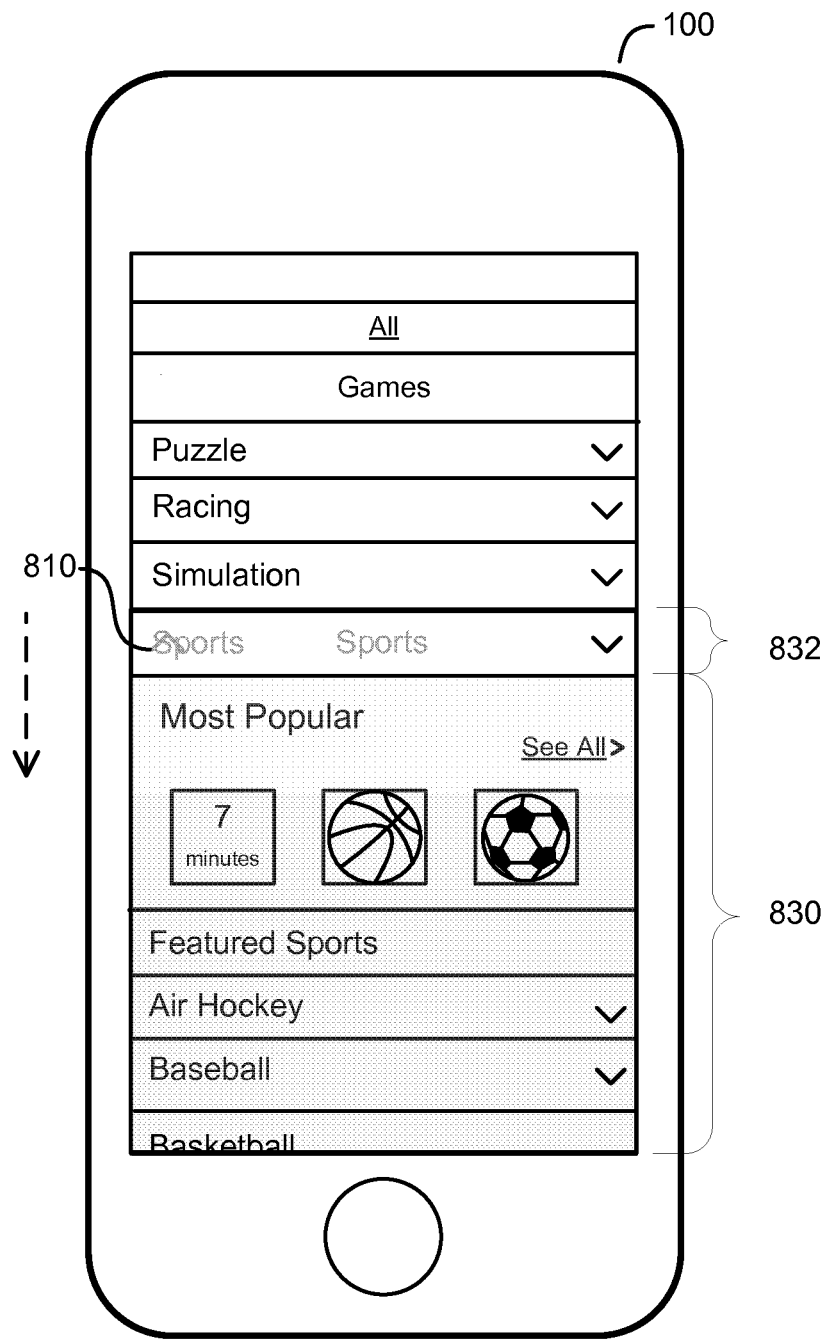

In some embodiments, as shown in FIG. 10C, a shading of a portion of the user interface 830 becomes darker as the header text moves downward on the display. The header text 810 may fade from a center of the header 832 to a side of the display.

Figure 10D:
Figure 10E:

FIG. 10D illustrates the header text transformed into a child-node identifier 802 associated with the ancestor node, completing the transition to the user interface associated with the ancestor node (for example, the interface 600). If a top of the user interface is not displayed when the header text has been transformed into a child-node identifier, the user interface 600 may scroll upward until the top of the interface 600 is displayed, as shown in FIG. 10E.

The device 100 also displays a transition to a user interface associated with a child node. If the child node of the node associated with the user interface 830 is another internal node of the category tree, the transition to the user interface associated with the child node may be similar to the transition to the user interface 830 illustrated in FIGS. 8A-E. If the child node is a leaf node of the category tree, the device 100 displays a transition to a leaf-node user interface. FIGS. 11A-E illustrate a transition to navigate from the user interface 830 to a user interface associated with a leaf node, according to one embodiment. Some aspects of the transition to the leaf-node user interface may be similar to the transition between internal nodes of the category tree as illustrated in FIGS. 8A-E.

Figure 11A:
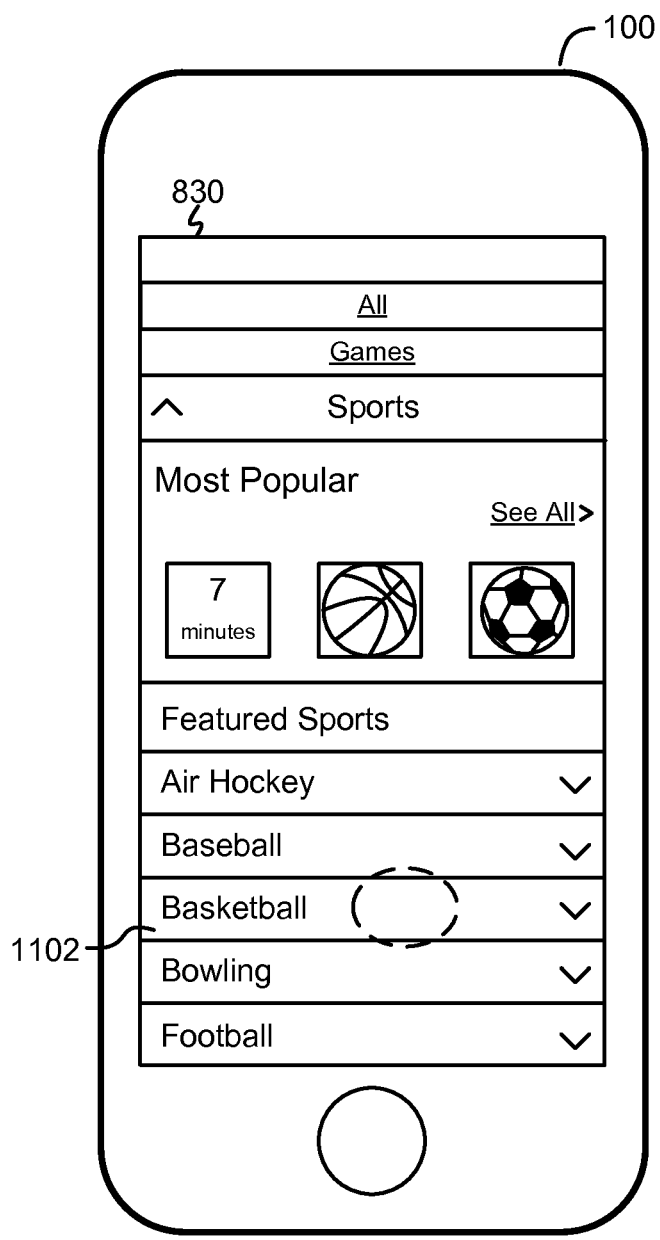
FIGS. 11A-11E illustrate an exemplary transition from a user interface associated with an internal node of a category tree to a user interface associated with a leaf node in accordance with some embodiments.
Figure 11B:
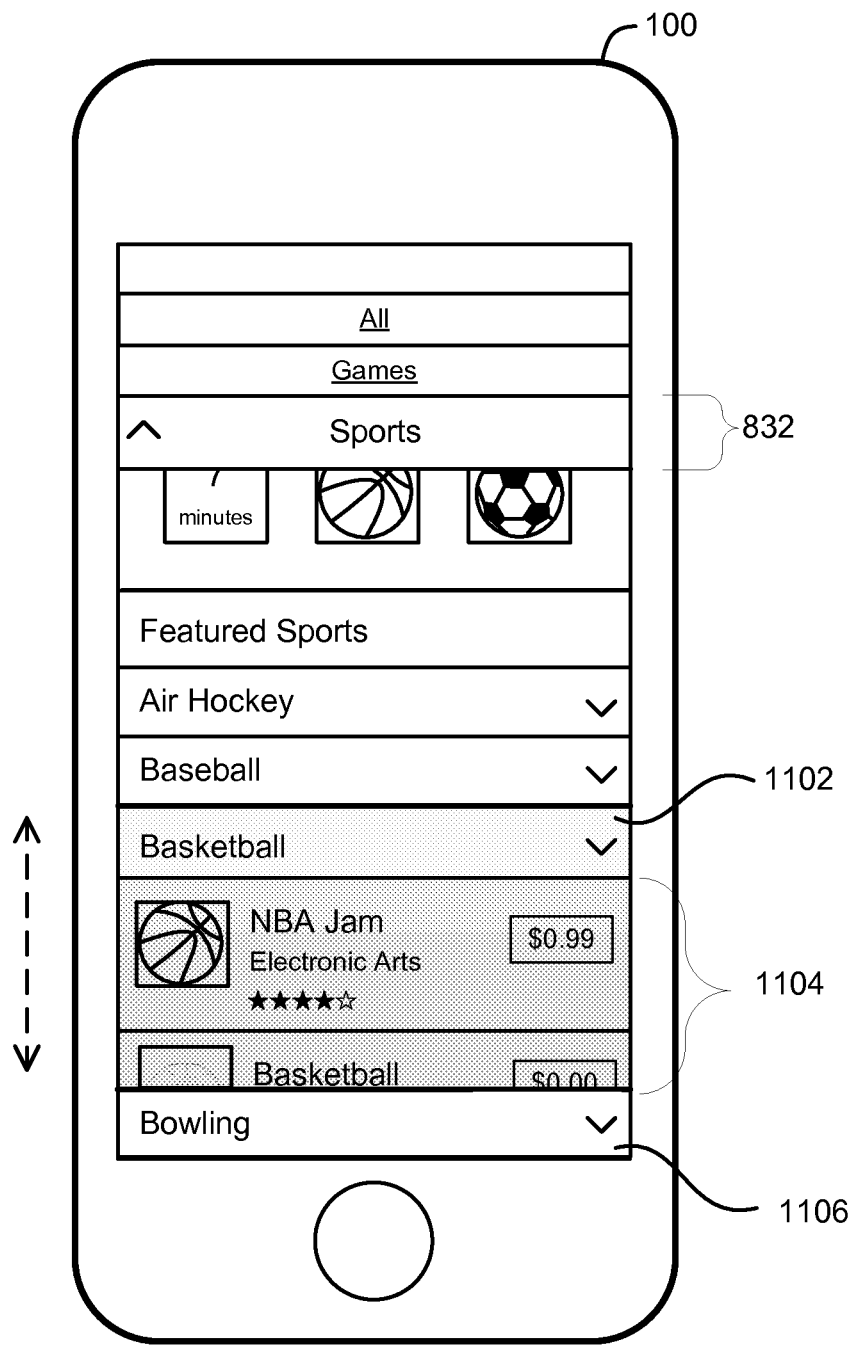

As shown in FIG. 11A, a selection of a child-node identifier 1102 is received. In response to receiving the selection, the device 100 begins moving the selected identifier 1102 upward toward the header region 832 to begin displaying a portion 1104 of an interface associated with the child node. The child-node identifier below the selected identifier 1102 on the user interface 830 (the "Bowling" identifier 1106 in the example of FIG. 11B) may begin moving downward, such that the portion 1104 of the interface associated with the selected child node 1102 expands in two directions.

In some embodiments, a shading of the portion 1104 of the interface associated with the child node is initially displayed during the transition as a darker color. As the transition progresses, the shading of the displayed portion 1104 of the interface associated with the selected child node becomes progressively lighter. A shading of the child-node identifier 1102 may also change during the transition. For example, after a selection of the child-node identifier 1102 is detected, the child-node identifier 1102 may initially be displayed in a darker shading to visually distinguish the selected child-node identifier 1102 from the other child-node identifiers. As the transition proceeds, the shading of the child-node identifier 1102 may become progressively lighter.

Figure 11C:
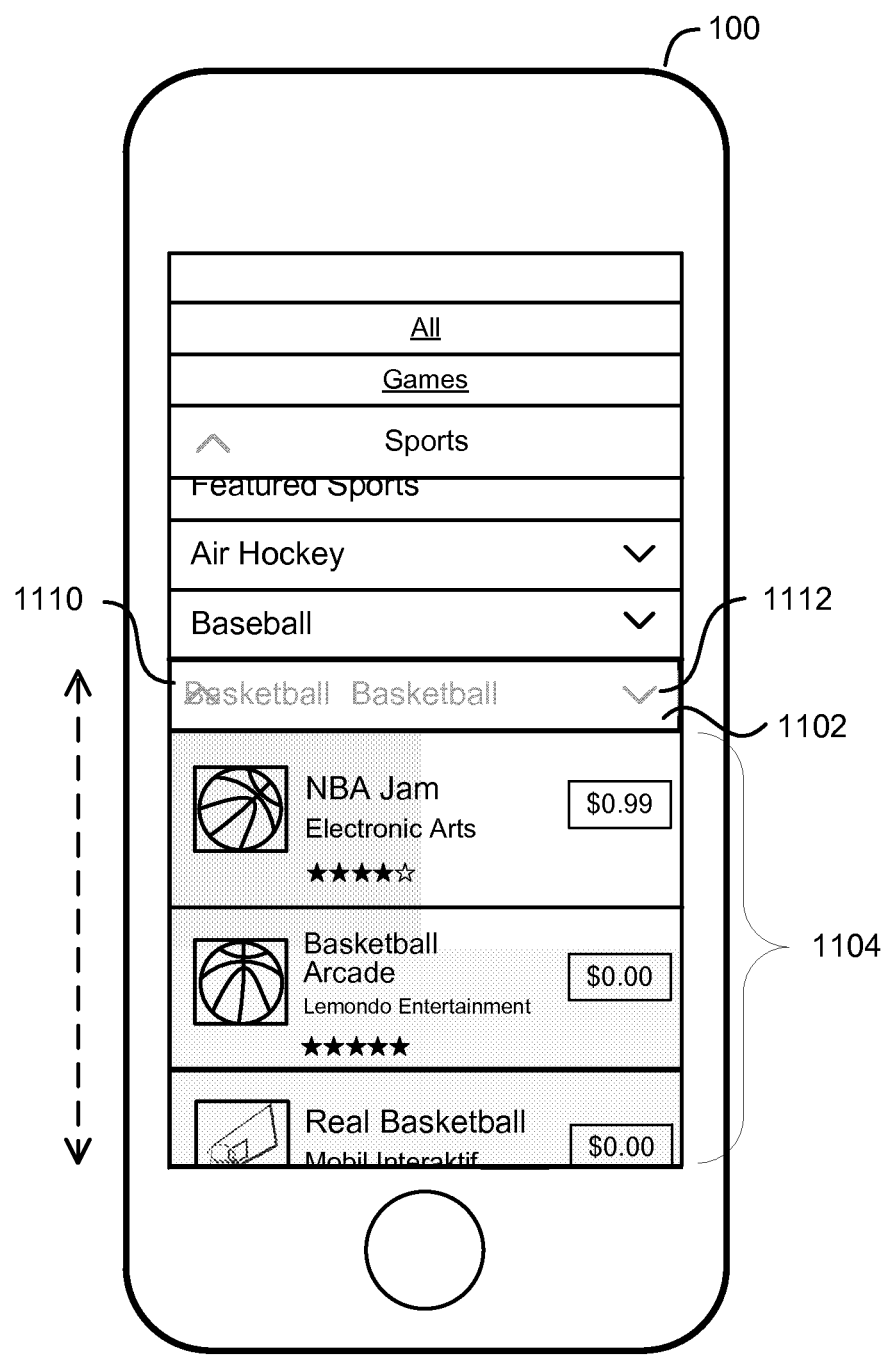

FIG. 11C illustrates a later stage of the transition. As shown in FIG. 11C, the child-node identifier 1102 continues to move upward on the display of the device 100 to display a larger portion 1104 of the interface associated with the selected child-node identifier 1102. In some embodiments, the title 1110 on the child-node identifier 1102 begins to fade away from a side of the child-node identifier 1102 and fade into a center of the child-node identifier 1102. Furthermore, the caret 1112 may begin to fade away.

Figure 11D:
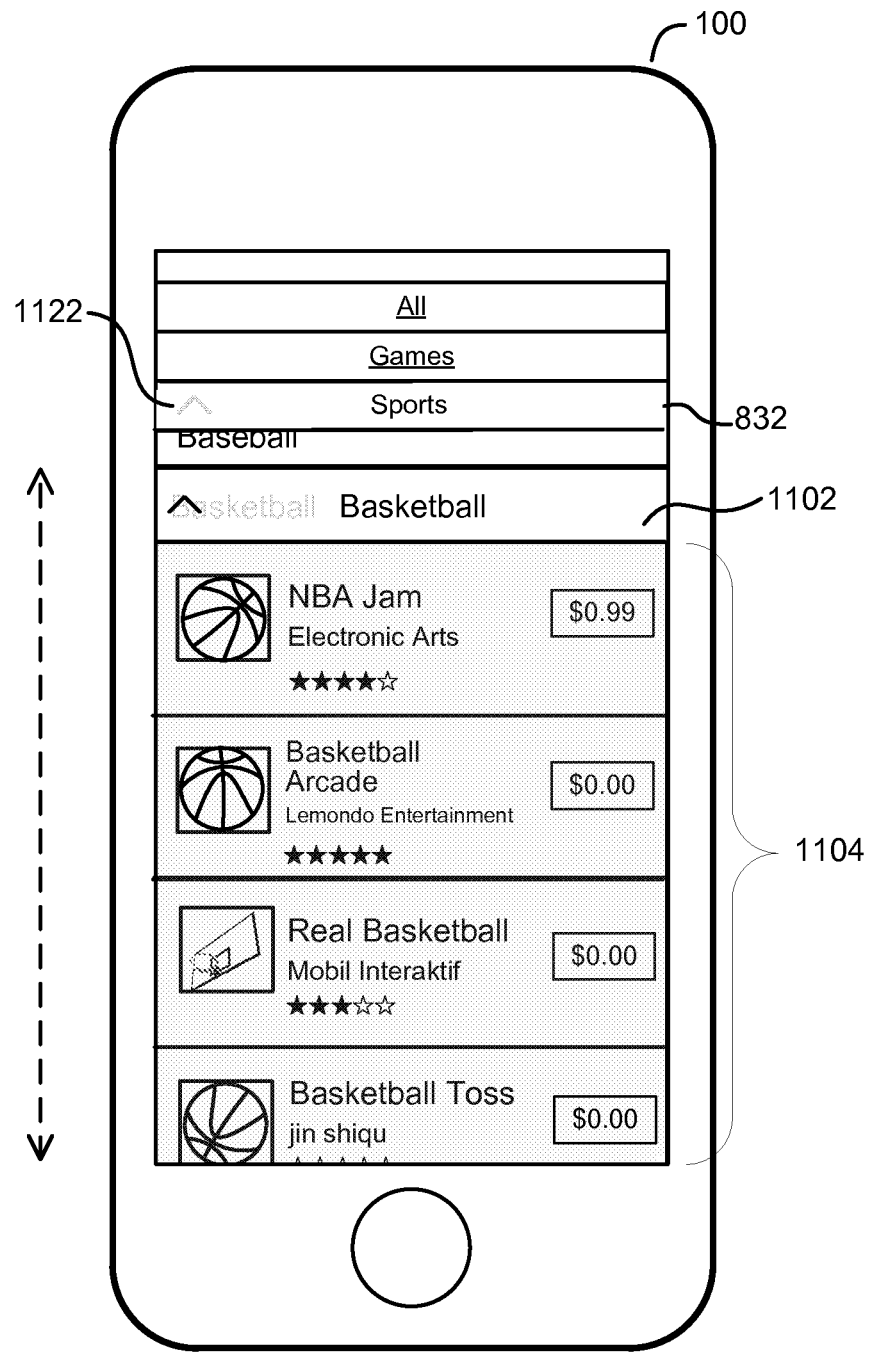

FIG. 11D illustrates the transition when it is nearly complete. The application count 1122 previously displayed on the header 832 is fading away, and a caret is fading in. In some embodiments, the header text 832 shrinks, changes colors, or is otherwise transformed to visually distinguish the header text from the child-node identifier 1102. The portion 1104 of the user interface associated with the child node occupies a majority of the display of the device 100, and its shading is lighter than its initial shading during the transition.

Figure 11E:
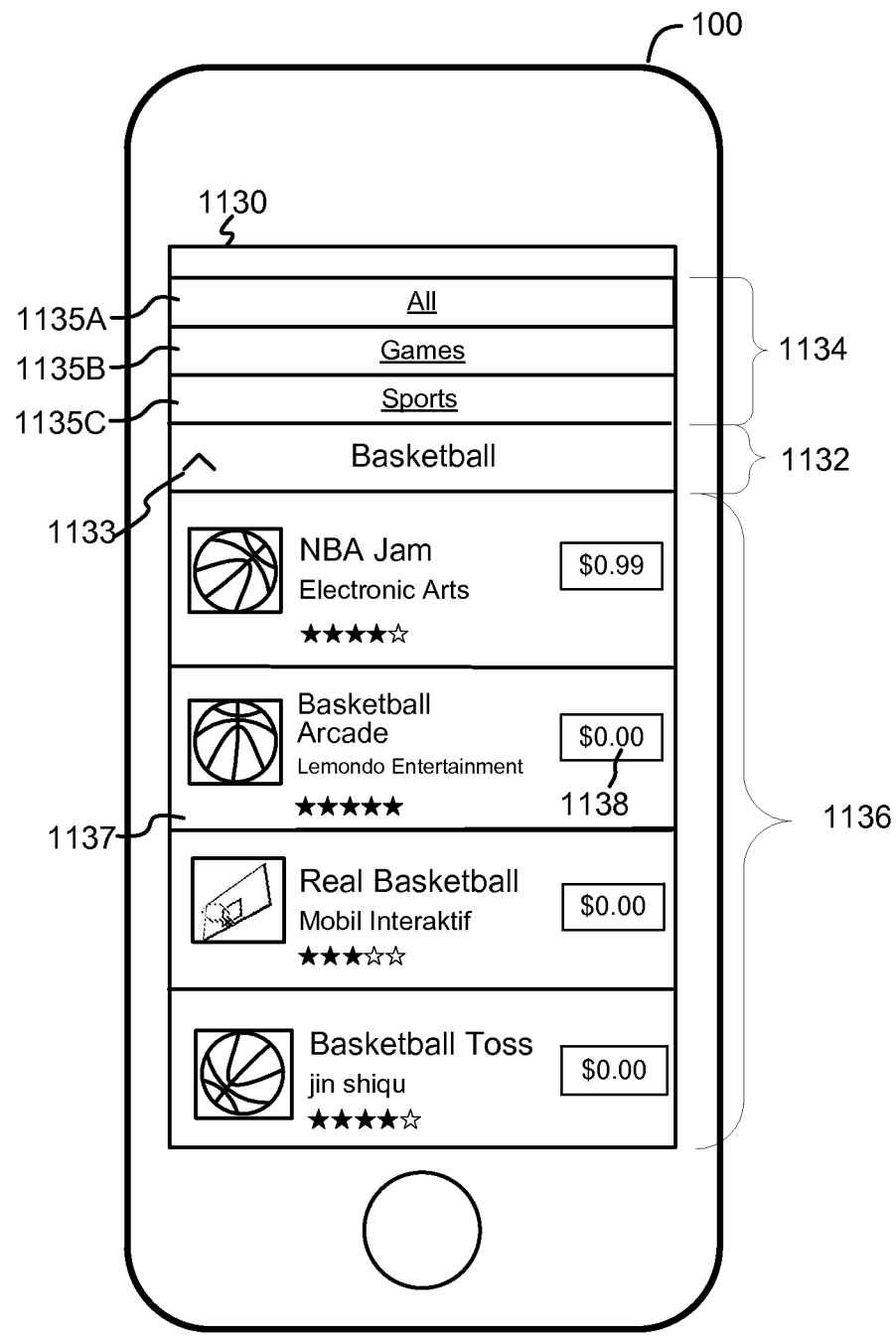

FIG. 11E illustrates an example user interface 1130 associated with the selected child-node identifier, displayed at the completion of the transition. In FIG. 11E, the user interface 1130 is a leaf-node user interface, or an interface associated with the lowest level in the category hierarchy. In some embodiments, the leaf-node user interface 1130 comprises a header region 1132, a context region 1134, and a content item region 1136. Other embodiments of the leaf-node user interface 1130 include additional, fewer, or different regions.

The header region 1132 identifies the node of the category tree associated with the leaf-node user interface 1130. The header region 1132 may include a caret 1133 as a selectable link to a higher-level node in the category tree. For example, a selection of the caret 1133 is interpreted as an input to navigate to the parent node of the node associated with the user interface 1130 (that is, the "Sports" category in the example of FIG. 11E). In some embodiments, the header region 1132 is the header region 610 or the header region 832 updated to include information identifying the node associated with the leaf-node user interface 1130.

The context region 1134 includes labels 1135A-C (collectively, the labels 1135) identifying ancestor nodes of the node associated with the user interface 1130. The labels 1135 are arranged vertically above the header region 1132. In some embodiments, the labels 1135 are displayed in a smaller size than the header text to distinguish the labels 1135 from the header text. The labels 1135 may additionally or alternatively be displayed in a different color, a different font, a different font face, or be otherwise distinguished from the header text. The labels 1135 may also be selectable labels, such that a user input received at one of the labels 1135 causes the device 100 to display the user interface associated with the corresponding label.

The content item region 1136 includes representations 1137 of one or more content items belonging to the node associated with the user interface 1130. The content item representations 1137 may be arranged in the content item region 1136 according to a number of downloads of each content item, ratings of the content items, price, or other factors. For example, the content item region 1136 includes a vertical list of content item representations 1137, where the representations 1137 at the top of the list have been downloaded most frequently, have the highest ratings, or have the highest price, while the representations 1137 at the bottom of the list have been downloaded least frequently, have the lowest ratings, or have the lowest price.

In some embodiments, the representations 1137 of the content items in the leaf-node user interface are different from the representations of the content items in a user interface associated with an internal node (e.g., the content item representations 632 described with respect to FIG. 6A). Some embodiments of the content item representations 1137 in the leaf-node user interface include extra information about the corresponding content items that is not included in user interfaces associated with internal nodes, such as a title, a publisher, a rating, or a thumbnail image associated with each content item. Some embodiments of the content item representations 1137 include actionable user interface elements, such as a purchase now button 1138 and a selectable link to a page having more information about the corresponding content item. For example, the device 100 displays a page having a description of the content item, reviews, and a link to purchase or download the content item in response to a selection of the selectable link in the content item representation 1137. The content item representations 1137 may themselves be selectable links, or a portion of the content item representations 1137 may be a selectable link (e.g., a title of the content item in each representation 1137 is a selectable link). The content item representation 1137 also includes a purchase now button 1138 in some embodiments. A user may select the purchase now button 1138 to purchase or download the corresponding content item.

Figure 12A:
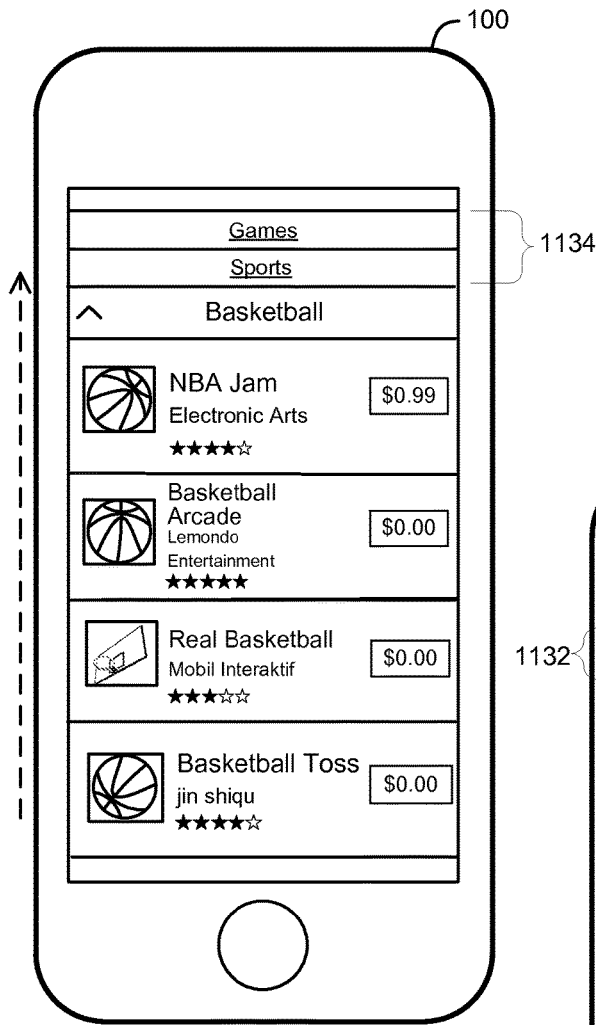
FIGS. 12A-12B illustrate an exemplary user interface associated with a leaf node in accordance with some embodiments.
Figure 12B:

In some cases, the content item region 1136 includes more content item representations 1137 than can be displayed simultaneously on the device 100. Accordingly, the content item region 1136 is scrollable in some embodiments. FIG. 12A illustrates a downward scrolling through the content item region 1136, such that the content item representations 1137 move upward on the device 100. In some embodiments, at least a portion of the context region 1134 scrolls off the display of the device 100 to provide space to display additional content item representations 1137. For example, FIG. 12A illustrates the label 1135A has been scrolled off the display. As a user continues to scroll down the list of content item representations 1137, as shown in FIG. 12B, the labels 1135B and 1135C also scroll off the display. In some embodiments, the header region 1132 remains on the display to provide context for the list of content item representations 1137. In a similar manner to the context region 834 described with respect to FIGS. 9C-F, the context region 1134 is redisplayed/scrolled into view in response to an input to scroll upward through the content item representations 1137 (that is, an input to move the content item representations 1137 downward on the display) or in response to a selection of the header region 1132.

Figure 13:
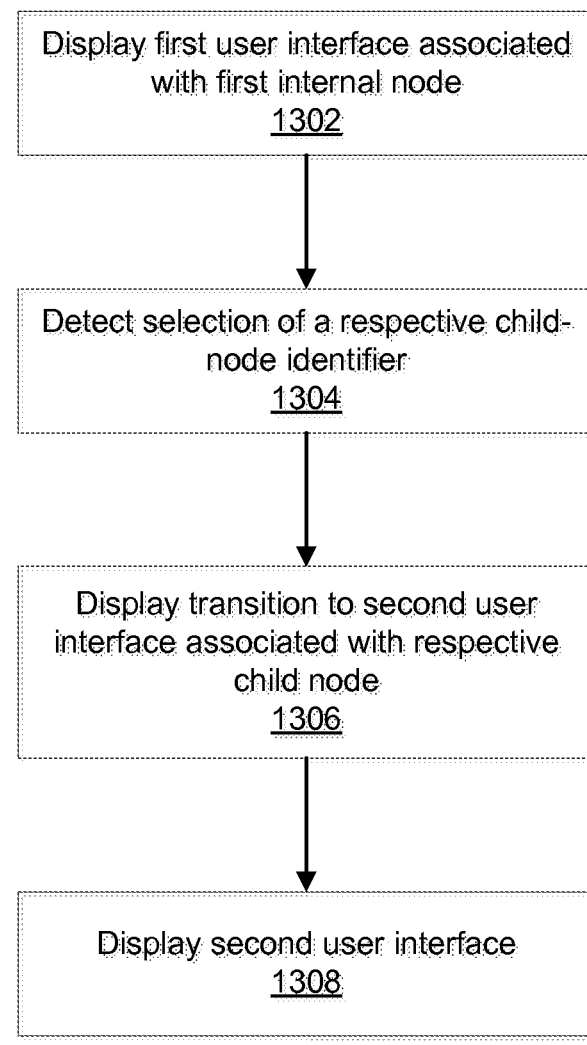
FIG. 13 is a flowchart illustrating a method for navigating a content hierarchy in accordance with some embodiments.

FIG. 13 is a flowchart illustrating a method 1300 for navigating a content hierarchy, according to one embodiment. The method 1300 is performed at an electronic device (e.g., portable multifunction device 100 shown in FIG. 1A or device 300 shown in FIG. 3). Other embodiments of the method 1300 may include fewer, additional, or different steps, and the steps may be performed in different orders.

As described below, the method 1300 improves a user's understanding of relationships between categories in a content hierarchy and the user's navigation through the content hierarchy. The method 1300 provides for logical navigation and illustrates relationships between content items and the rest of the hierarchy without overly cluttering the user interface.

The electronic device displays 1302 a first user interface (e.g., user interface 600 in FIGS. 6A-6D) associated with a first internal node of a category hierarchy, or a node that is below the root node of the category hierarchy and has one or more child nodes. In some embodiments, the first user interface displayed by the electronic device includes a context region, a header region, and a child-node region. The context region (e.g., context region 620 in FIG. 6A) comprises one or more selectable labels (e.g., label 622 in FIG. 6A) identifying one or more ancestor nodes of the first internal node in the category hierarchy. In some embodiments, the selectable labels are displayed in a vertical arrangement. The header region (e.g., header region 610 in FIG. 6A) includes information identifying the first internal node, such as a name or a title of the first internal node. The header region is displayed below the vertically-arranged selectable labels in some embodiments. The child-node region (e.g., child-node region 640 in FIG. 6A) comprises one or more selectable identifiers (e.g., identifiers 642 in FIG. 6A) that correspond to one or more child nodes of the first internal node.

The electronic device detects 1304 selection of a respective one of the child-node identifiers (e.g., identifier 802 in FIG. 8A), which corresponds to a respective child node of the category hierarchy. For example, a user of the electronic device selects one of the child-node identifiers to navigate to a user interface associated with the respective child node, and the electronic device detects 1304 the user's selection.

In response to detecting 1304 the selection of the respective child-node identifier, the electronic device displays 1306 a transition to a second user interface (e.g., user interface 830 in FIGS. 8E and 9A-9F) that is associated with the selected child node. During the transition, the electronic device maintains display of the one or more selectable labels in the context region while moving the respective child-node identifier upward toward the header region. In some embodiments, the moved child-node identifier is transformed into information identifying the respective child node in the header region. The information identifying the first internal node that was previously displayed in the header region is transformed into a selectable label (e.g., label 835B in FIG. 8E) identifying the first internal node as an ancestor node of the respective child node. In some embodiments, the selectable label for the first internal node is added to a bottom of the vertical arrangement of selectable labels identifying the ancestor nodes of the first internal node.

At the completion of the transition, the electronic device displays 1308 the second user interface. In some embodiments, the second user interface includes a second or updated context region (e.g., context region 834 in FIG. 8E) including selectable labels (e.g., labels 835 in FIG. 8E) identifying ancestor nodes of the respective child node. The second user interface also includes a second or updated header region (e.g., header region 832 in FIG. 8E) comprising information identifying the respective child node, as well as a second or updated child-node region (e.g., child-node region 838 in FIG. 8E) comprising one or more selectable identifiers that correspond to one or more child nodes of the respective child node.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

Any of the steps, operations, or processes described herein may be performed or implemented with one or more hardware or software modules, alone or in combination with other devices. In some embodiments, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method, comprising:
   at a portable electronic device including a display and one or more input devices:
   displaying, on the display, a user interface including a context region comprising one or more selectable labels identifying one or more ancestor nodes, a header region comprising information identifying a first internal node that descends from the one or more ancestor nodes, and a child-node region comprising a first plurality of selectable child-node identifiers that correspond to a first plurality of child nodes that are descendants of the first internal node, wherein each child node is a peer of the other child nodes, wherein the header region is displayed in a fixed position;
   receiving, via the one or more input devices, a first user input that selects a first child-node identifier of the first plurality of child-node identifiers, wherein the first child-node identifier corresponds to a first child node of the first plurality of child nodes;
   in response to the first user input selecting the first child-node identifier:
      expanding a display area associated with the first child node;
      modifying the display of a second selectable child-node identifier of the first plurality of selectable child-node identifiers, wherein the second selectable child-node identifier corresponds to a second child node of the first plurality of child nodes; and
      maintaining the display of a third selectable child-node identifier of the first plurality of selectable child-node identifiers, wherein the third selectable child-node identifier corresponds to a third child node of the first plurality of child nodes;
   receiving, via the one or more input devices, a scroll input subsequent to receiving the first user input; and
   in response to receiving the scroll input:
      repositioning the first plurality of selectable child-node identifiers while maintaining the display of the first internal node in the header region, wherein a respective selectable label for the first internal node and the first plurality of selectable child node identifiers are displayed concurrently, on the display; and
      ceasing to display the context region and maintaining display of the header region during the scrolling while a portion of the first plurality of selectable child-node identifiers slide under the header region to provide space to display one or more additional child-node identifiers.

2. The method of claim 1, wherein the selectable labels of the context region are vertically arranged.

3. The method of claim 1, wherein the selectable labels in the context region are displayed in a smaller size than the header identifying the first internal node.

4. The method of claim 1, wherein the selectable labels in the context region are displayed in a different color than the header identifying the first internal node.

5. The method of claim 1, wherein modifying the display of the second selectable child-node identifier comprises:
   concealing a portion of the second selectable child-node identifier.

6. The method of claim 1, wherein modifying the display of the second selectable child-node identifier comprises:
   ceasing to display the second selectable child-node identifier.

7. The method of claim 1, further comprising:
   in response to expanding the display area associated with the first child node:
   displaying, within the display area associated with the first child node, a second plurality of selectable child-node identifiers that correspond to a second plurality of child nodes that are descendants of the first child node.

8. The method of claim 7, wherein the display area associated with the first child node is below the first selectable child-node identifier and above the second selectable child-node identifier.

9. The method of claim 7, further comprising:
receiving a second user input to display a third plurality of child nodes that are descendants of the first child node and peers of the second plurality of child nodes; and
in response to receiving the second user input:
displaying, within the display area associated with the first child node, a third plurality of selectable child-node identifiers that correspond to the third plurality of child nodes.

10. The method of claim 9, further comprising:
in response to receiving the second user input:
adjusting a display property of the display area associated with the first child node.

11. The method of claim 10, wherein adjusting the display property comprises one or more of:
adjusting a brightness value associated with the display area;
adjusting a transparency value associated with the display area;
adjusting a saturation value associated with the display area; and
adjusting a contrast value associated with the display area.

12. The method of claim 9, further comprising:
in response to receiving the second user input:
modifying the display of the third selectable child-node identifier.

13. The method of claim 12, wherein modifying the display of third selectable child-node identifier comprises:
concealing a portion of the third selectable child-node identifier.

14. The method of claim 12, wherein modifying the display of third selectable child-node identifier comprises:
ceasing to display the third selectable child-node identifier.

15. The method of claim 9, wherein receiving the second user input comprises receiving a scroll input within the display area associated with the first child node.

16. The method of claim 1, wherein receiving the first user input comprises receiving a touch input at a location that corresponds with the first selectable child-node identifier.

17. A non-transitory computer-readable storage medium including instructions to:
display, on a display of a portable electronic device, a user interface including a context region comprising one or more selectable labels identifying one or more ancestor nodes, a header region comprising information identifying a first internal node that descends from the one or more ancestor nodes, and a child-node region comprising a first plurality of selectable child-node identifiers that correspond to a first plurality of child nodes that are descendants of the first internal node, wherein each child node is a peer of the other child nodes, wherein the header region is displayed in a fixed position;
receive, via one or more input devices, a first user input that selects a first child-node identifier of the first plurality of child-node identifiers, wherein the first child-node identifier corresponds to a first child node of the first plurality of child nodes;
in response to the first user input selecting the first child-node identifier:
expand a display area associated with the first child node;
modify the display of a second selectable child-node identifier of the first plurality of selectable child-node identifiers, wherein the second selectable child-node identifier corresponds to a second child node of the first plurality of child nodes; and
maintain the display of a third selectable child-node identifier of the first plurality of selectable child-node identifiers, wherein the third selectable child-node identifier corresponds to a third child node of the first plurality of child nodes;
receive, via the one or more input devices, a scroll input subsequent to receiving the first user input; and
in response to receiving the scroll input:
reposition the first plurality of selectable child-node identifiers while maintaining the display of the first internal node in the header region, wherein a respective selectable label for the first internal node and the first plurality of selectable child node identifiers are displayed concurrently, on the display; and
cease to display the context region and maintain display of the header region during the scrolling while a portion of the first plurality of selectable child-node identifiers slide under the header region to provide space to display one or more additional child-node identifiers.

18. A portable electronic device comprising:
a display; and
a non-transitory computer-readable storage medium including instructions to:
display, on the display, a user interface including a context region comprising one or more selectable labels identifying one or more ancestor nodes, a header region comprising information identifying a first internal node that descends from the one or more ancestor nodes, and a child-node region comprising a first plurality of selectable child-node identifiers that correspond to a first plurality of child nodes that are descendants of the first internal node, wherein each child node is a peer of the other child nodes, wherein the header region is displayed in a fixed position;
receive, via one or more input devices, a first user input that selects a first child-node identifier of the first plurality of child-node identifiers, wherein the first child-node identifier corresponds to a first child node of the first plurality of child nodes; and
in response to the first user input selecting the first child-node identifier:
expand a display area associated with the first child node;
modify the display of a second selectable child-node identifier of the first plurality of selectable child-node identifiers, wherein the second selectable child-node identifier corresponds to a second child node of the first plurality of child nodes; and
maintain the display of a third selectable child-node identifier of the first plurality of selectable child-node identifiers, wherein the third selectable child-node identifier corresponds to a third child node of the first plurality of child nodes;
receive, via the one or more input devices, a scroll input subsequent to receiving the first user input; and
in response to receiving the scroll input:
reposition the first plurality of selectable child-node identifiers while maintaining the display of the first internal node in the header region, wherein a respective selectable label for the first internal node and the first plurality of selectable child node identifiers are displayed concurrently, on the display; and cease to display of the context region and maintain display of the header region during the scrolling while a portion of the first plurality of selectable child-node identifiers slide under the header region to provide space to display one or more additional child-node identifiers; and a computer processor for executing the instructions.

* * * * *